US011399334B2

United States Patent
Bhattad et al.

(10) Patent No.: US 11,399,334 B2
(45) Date of Patent: Jul. 26, 2022

(54) CHANNEL ACCESS FOR DISCOVERY REFERENCE SIGNAL (DRS) TRANSMISSION IN NEW RADIO-UNLICENSED (NR-U)

(71) Applicant: QUALCOMM INCORPORATED, San Diego, CA (US)

(72) Inventors: Kapil Bhattad, Bangalore (IN); Ananta Narayanan Thyagarajan, Bangalore (IN); Xiaoxia Zhang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/861,197

(22) Filed: Apr. 28, 2020

(65) Prior Publication Data

US 2020/0351758 A1 Nov. 5, 2020

(30) Foreign Application Priority Data

May 2, 2019 (IN) .............................. 201941017558

(51) Int. Cl.
*H04W 48/10* (2009.01)
*H04W 74/08* (2009.01)
*H04W 16/14* (2009.01)

(52) U.S. Cl.
CPC ........... *H04W 48/10* (2013.01); *H04W 16/14* (2013.01); *H04W 74/0808* (2013.01)

(58) Field of Classification Search
CPC .. H04W 48/10; H04W 16/14; H04W 74/0808
(Continued)

(56) References Cited

U.S. PATENT DOCUMENTS

2017/0093542 A1* 3/2017 Li .................... H04L 27/0006
2019/0075596 A1* 3/2019 Ye ..................... H04W 74/0816
(Continued)

FOREIGN PATENT DOCUMENTS

DE 102019103265 A1 * 8/2019 ............ H04L 47/30
WO 2017078775 A1 5/2017

OTHER PUBLICATIONS

International Search Report and Written Opinion—PCT/US2020/030417—ISAEPO—dated Aug. 24, 2020.
(Continued)

*Primary Examiner* — Mong-Thuy T Tran
(74) *Attorney, Agent, or Firm* — Haynes and Boone, LLP

(57) ABSTRACT

Wireless communications systems and methods related to channel access for discovery reference signal (DRS) transmissions in a spectrum shared by multiple network operating entities are provided. A first wireless communication device identifies a plurality of allowable transmission starting locations within a DRS measurement time configuration (DMTC) window, where at least one of the plurality of allowable transmission starting locations is offset from boundaries of a plurality of transmission slots of the DMTC window. The plurality of allowable transmission starting locations is associated with an allowable number of category 2 (CAT2) listen-before-talks (LBTs) within the DMTC window and a duration of the DRS transmission. The first wireless communication device communicates, with a second wireless communication device, a DRS beginning at a first transmission starting location of the plurality of allowable transmission starting locations.

30 Claims, 11 Drawing Sheets

(58) Field of Classification Search
USPC .......................................................... 455/454
See application file for complete search history.

(56) References Cited

U.S. PATENT DOCUMENTS

| | | | | |
|---|---|---|---|---|
| 2019/0132103 | A1* | 5/2019 | Yang | H04L 5/0037 |
| 2019/0191457 | A1* | 6/2019 | Si | H04W 48/12 |
| 2019/0254047 | A1* | 8/2019 | Ahmed | H04W 28/0231 |
| 2020/0053781 | A1* | 2/2020 | Pan | H04J 11/0069 |
| 2020/0275483 | A1* | 8/2020 | Li | H04W 74/0808 |
| 2021/0051683 | A1* | 2/2021 | Li | H04L 41/0806 |
| 2021/0153107 | A1* | 5/2021 | Xu | H04L 5/0048 |
| 2021/0195639 | A1* | 6/2021 | Kim | H04W 72/1268 |
| 2021/0298045 | A1* | 9/2021 | Kim | H04W 72/1268 |

OTHER PUBLICATIONS

Interdigital Inc: "Discussion on Procedures for Initial Access and Mobility in NR-U", 3GPP Draft, 3GPP TSG RAN WG1 Meeting #95, R1-1813221, 3rd Generation Partnership Project (3GPP), Mobile Competence Centre, 650, Route Des Lucioles, F-06921 Sophia-Antipolis Cedex, France, vol. RAN WG1, No. Spokane, USA, Nov. 12, 2018-Nov. 16, 2018, Nov. 11, 2018 (Nov. 11, 2018), XP051555224, 12 Pages, Retrieved from the Internet: URL: http://www.3gpp.org/ftp/Meetings%5F3GPP%5FSYNC/RAN1/Docs/R1%2D1813221%2Ezip, [retrieved on Nov. 11, 2018], [retrieved on Nov. 11, 2018], Section 1, Section 2, Section 5.

Nokia, et al., "On Enhancements to Initial Access Procedures for NR-U", 3GPP Draft, 3GPP TSG RAN WG1 Ad-Hoc Meeting 1901, R1-1900309 Enhancements to Initial Access Procedures, 3rd Generation Partnership Project (3GPP), Mobile Competence Centre, 650, Route Des Lucioles, F-06921 Sophia-Antipolis Cedex, France, vol. RAN WG1, No. Taipei, Taiwan, Jan. 21, 2019-Jan. 25, 2019, Jan. 20, 2019 (Jan. 20, 2019), XP051593223, 14 Pages, Retrieved from the Internet: URL: http://www.3gpp.org/ftp/Meetings%5F3GPP%5FSYNC/RAN1/Docs/R1%2D1900309%2E.zip, retrieved on Jan. 20, 2019], Section 2.1, Figure 1.

Samsung: "Enhancements to Initial Access Procedure for NR-U", 3GPP Draft, 3GPP TSG RAN WG1 Ad-hoc Meeting 1901, R1-1901032—Enhancements to Initial Access Procedure for NR-U, 3rd Generation Partnership Project (3GPP), Mobile Competence Centre, 650, Route Des Lucioles, F-06921 Sophia-Antipolis Cedex, vol. RAN WG1, No. Taipei, Taiwan, Jan. 21, 2019-Jan. 25, 2019, Jan. 20, 2019 (Jan. 20, 2019), XP051593877, 10 pages, Retrieved from the Internet: URL: http://www.3gpp.org/ftp/Meetings%5F3GPP%5FSYNC/RAN1/Docs/R1%2D1901032%2E.zip [retrieved on Jan. 20, 2019], Section 2, figure 2.

* cited by examiner

CHANNEL ACCESS FOR DISCOVERY REFERENCE SIGNAL (DRS) TRANSMISSION IN NEW RADIO-UNLICENSED (NR-U)

CROSS REFERENCE TO RELATED APPLICATIONS

The present application claims priority to and the benefit of Indian Provisional Patent Application No. 201941017558, filed May 2, 2019, which is hereby incorporated by reference in its entirety as if fully set forth below and for all applicable purposes.

TECHNICAL FIELD

This application relates to wireless communication systems, and more particularly to channel access for discovery reference signal (DRS) transmissions in a spectrum shared by multiple network operating entities.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology. For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

One approach to avoiding collisions when communicating in a shared spectrum or an unlicensed spectrum is to use a listen-before-talk (LBT) procedure to ensure that the shared channel is clear before transmitting a signal in the shared channel. The operations or deployments of NR in an unlicensed spectrum is referred to as NR-U. In NR-U, a transmitting node (e.g., a BS or a UE) may perform a category 1 (CAT1) LBT (e.g., no LBT measurement), a category 2 (CAT2) LBT, or a category 4 (CAT4) LBT prior to transmitting a communication signal in an unlicensed spectrum. In some countries or regions, government bodies may regulate LBT operations in an unlicensed spectrum (e.g., in the 2.4 gigahertz (GHz) bands and the 5 GHz bands). For example, a regulatory authority may limit the duration a wireless device may transmit within a period without performing an LBT and/or the number of CAT2 LBTs a wireless device may attempt within a time period.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication, includes identifying, by a first wireless communication device, a plurality of allowable transmission starting locations within a discovery reference signal measurement time configuration (DMTC) window, wherein at least one of the plurality of allowable transmission starting locations is offset from boundaries of a plurality of transmission slots of the DMTC window, and wherein the plurality of allowable transmission starting locations is associated with an allowable number of category 2 (CAT2) listen-before-talks (LBTs) within the DMTC window; and communicating, by the first wireless communication device with a second wireless communication device, a discovery reference signal (DRS) beginning at a first transmission starting location of the plurality of allowable transmission starting locations.

In an additional aspect of the disclosure, an apparatus includes a processor configured to identify a plurality of allowable transmission starting locations within a discovery reference signal measurement time configuration (DMTC) window, wherein at least one of the plurality of allowable transmission starting locations is offset from boundaries of a plurality of transmission slots of the DMTC window, and wherein the plurality of allowable transmission starting locations is associated with an allowable number of category 2 (CAT2) listen-before-talks (LBTs) within the DMTC window; and a transceiver configured to communicate, with a wireless communication device, a discovery reference signal (DRS) beginning at a first transmission starting location of the plurality of allowable transmission starting locations.

In an additional aspect of the disclosure, a non-transitory computer-readable medium having program code recorded thereon, the program code includes code for causing a first wireless communication device to identify a plurality of allowable transmission starting locations within a discovery reference signal measurement time configuration (DMTC) window, wherein at least one of the plurality of allowable transmission starting locations is offset from boundaries of a plurality of transmission slots of the DMTC window, and wherein the plurality of allowable transmission starting locations is associated with an allowable number of category 2 (CAT2) listen-before-talks (LBTs) within the DMTC window; and code for causing the first wireless communication device to communicate, with a second wireless communication device, a discovery reference signal (DRS) beginning at a first transmission starting location of the plurality of allowable transmission starting locations.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
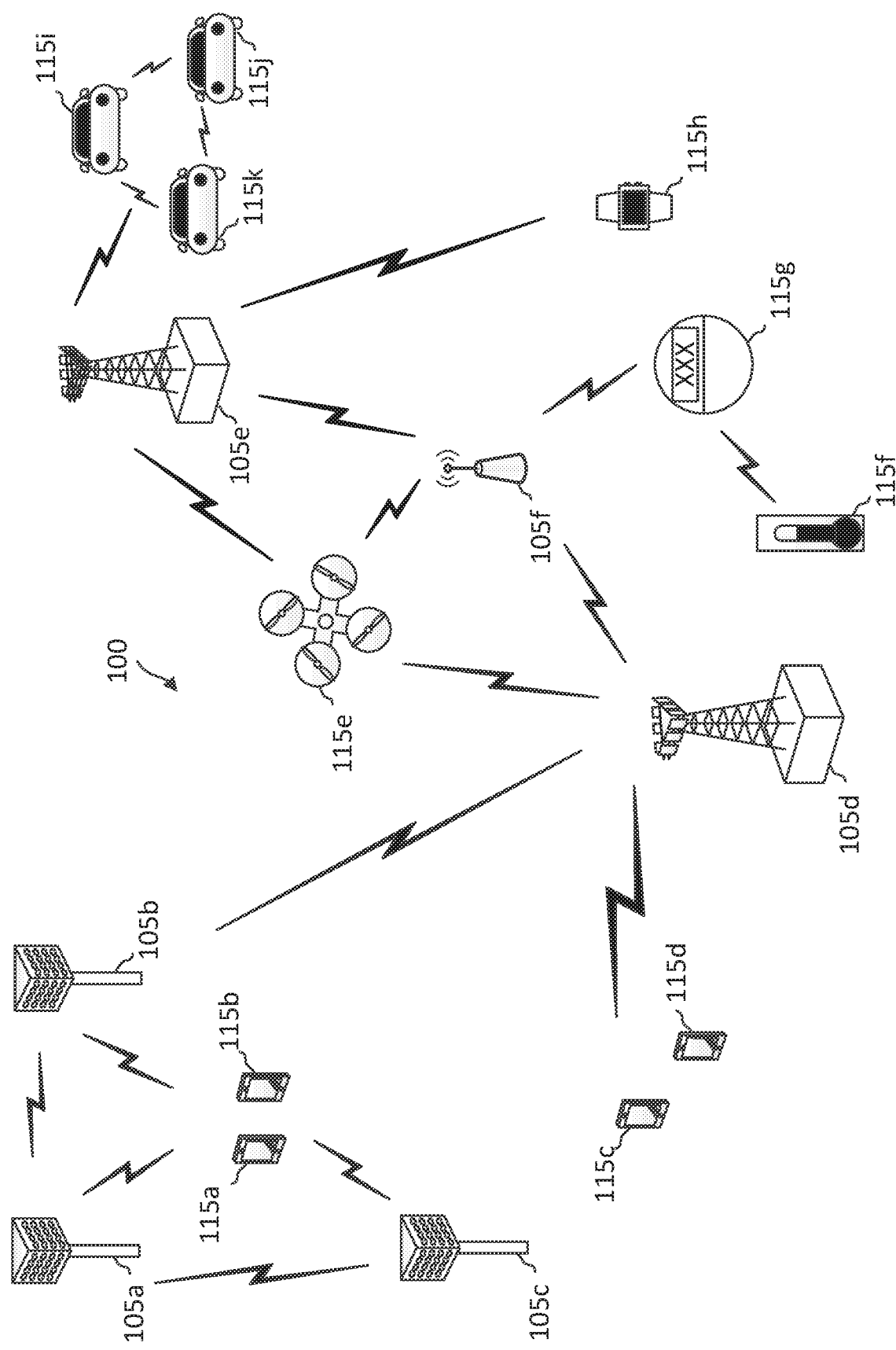
FIG. 1 illustrates a wireless communication network according to some embodiments of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km²), ultra-low complexity (e.g., ~10s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km²), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

In a wireless communication network, a BS may transmit discovery reference signals (DRSs) periodically to provide assistance to UEs for initial network access and cell measurements. A DRS may include one or more synchronization signal blocks (SSBs). Each SSB may include a primary synchronization signal (PSS), a secondary synchronization signal (SSS), and/or a physical broadcast channel (PBCH) signal including system information. In some instances, a DRS may additionally include remaining system information (RMSI) and paging information. When operating over an unlicensed spectrum, the BS may perform a listen-before-talk (LBT) prior to transmitting a DRS in the spectrum. Since transmissions in an unlicensed spectrum is subject to LBT results, the BS may configure periodic DRS measurement timing configuration (DMTC) windows where DRSs may be transmitted. For example, the BS may configure multiple starting locations in a DMTC window where the BS may begin to transmit a DRS. The BS may transmit a DRS in any one of the starting locations within a DMTC window depending on when the BS passes an LBT.

The present application describes mechanisms for accessing a shared channel in a shared frequency band or an unlicensed frequency band for DRS transmissions. For example, a BS may configure a plurality of allowable starting locations within a DMTC window for transmitting a DRS. The transmission starting locations may be aligned to boundaries of transmission slots of the DMTC window or offset from the transmission slot boundaries. The BS may configure the transmission starting locations based on a number of CAT2 LBT attempts allowed within the DMTC window. The BS may configure the transmission starting locations based on predetermined SSB locations and/or RMSI control information locations within a transmission slot. The BS may configure the transmissions starting locations based on the subcarrier spacing (SCS) used for transmitting the DRS, the number of SSBs in the DRS, the number of beams used for transmitting the DRS, and/or the transmission duration of the DRS. The BS may determine the number of transmission starting locations within the DMTC window based on the duration of the DMTC window.

In an embodiment, the BS may distribute the CAT2 LBT attempts across the transmission starting locations within the DMTC window. In other words, the BS may assign one or more CAT2 LBT attempts to each DRS transmission starting location. For example, the BS may attempt multiple CAT2 LBTs before a DRS transmission starting location, where a last CAT2 LBT attempt may correspond to the DRS transmission starting location. When the BS passes a CAT2 LBT in an earlier attempt (before the last attempt), the BS may transmit a filler signal or a reference signal to occupy the channel until the DRS transmission starting location and transmit a DRS beginning at the DRS transmission starting location.

In an embodiment, the BS may determine the number of allowable CAT2 LBTs within a DMTC window and/or the locations of the CAT2 LBTs in the DMTC window based on the SCS of the DRS, the number of SSBs in the DRS, the number of beams used for transmitting the DRS, the transmission duration of the DRS, and/or the periodicity of the DMTC window.

In an embodiment, the BS may broadcast a DRS configuration indicating DMTC window timing information (e.g., a duration and/or a periodicity) and potential DRS transmission starting locations within the DMTC windows. Thus, a UE may perform DRS detection and/or decoding based on the potential DRS transmission starting locations within the DMTC windows. In an embodiment, upon a CAT2 LBT failure in a DMTC window, the BS may perform a CAT4 LBT in the DMTC window before a next CAT2 LBT location. When the CAT4 LBT results in a pass, the BS may transmit a DRS. To reduce complexity at the UE, the BS may further restrict the CAT4 LBT locations within the DMTC windows and indicate the CAT4 LBT locations in the DRS configuration.

FIG. 1 illustrates a wireless communication network 100 according to some embodiments of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink and/or uplink, or desired transmission between BSs, and backhaul transmissions between BSs.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-hop configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as vehicle-to-vehicle (V2V), vehicle-to-everything (V2X), cellular-vehicle-to-everything (C-V2X) communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In an embodiment, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some embodiments, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In an embodiment, the network 100 may be an NR network deployed over a licensed spectrum. The BSs 105 can transmit synchronization signals (e.g., including a PSS and an SSS) in the network 100 to facilitate synchronization. The BSs 105 can broadcast system information associated with the network 100 (e.g., including a MIB, RMSI, and other system information (OSI)) to facilitate initial network access. In some instances, the BSs 105 may broadcast the PSS, the SSS, and/or the MIB in the form of SSBs over a PBCH and may broadcast the RMSI and/or the OSI over a physical downlink shared channel (PDSCH).

In an embodiment, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, and SRS.

After obtaining the MIB, the RMSI and/or the OSI, the UE 115 can perform a random access procedure to establish a connection with the BS 105. For the random access procedure, the UE 115 may transmit a random access preamble and the BS 105 may respond with a random access response. Upon receiving the random access response, the UE 115 may transmit a connection request to the BS 105 and the BS 105 may respond with a connection response (e.g., contention resolution message).

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The BS 105 may transmit a DL communication signal to the UE 115 via a PDSCH according to a DL scheduling grant. The UE 115 may transmit a UL communication signal to the BS 105 via a PUSCH and/or PUCCH according to a UL scheduling grant.

In an embodiment, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some embodiments, a BS 105 may assign a pair of BWPs within the CC to a UE 115 for UL and DL communications. For example, the BWP pair may include one BWP for UL communications and one BWP for DL communications.

In an embodiment, the network 100 may operate over a shared channel, which may include one or more shared frequency bands and/or one or more unlicensed frequency bands. For example, the network 100 may be an NR-U network. In such an embodiment, the BSs 105 and the UEs 115 may be operated by multiple network operating entities. To avoid collisions, the BSs 105 and the UEs 115 may access the shared channel based on an LBT procedure. To perform an LBT, a wireless communication device (e.g., a BS 105 or a UE 115) may perform clear channel assessment (CCA) to determine whether the channel is occupied by another node. The CCA may be based on energy detection and/or signal detection. When the LBT results in an LBT pass indicating that the channel is available, the wireless communication device may transmit in the shared channel. When the LBT results in an LBT failure indicating that the channel is not available (e.g., occupied by another transmission), the wireless communication device may refrain from transmitting in the shared channel and perform another LBT at a later time, for example, based on a backoff or a preconfigured transmission configuration.

In an embodiment, when operating over an unlicensed frequency band, a BS 105 may configure a DMTC window for DRS transmission to facilitate initial network access and signal measurements by the UEs 115. The DMTC window may be repeated at a certain periodicity (e.g., about 10 ms, about 20 ms, about 40 ms, about 80 ms, or about 160 ms). The BS 105 may perform an LBT prior to transmitting a DRS in a DMTC window. A DRS may include one or more SSBs. In some examples, a DRS may include between about one SSB to about eight SSBs. In some examples, the BS 105 may transmit each SSB in a different beam direction. The duration of a DRS may be dependent on the SCS of the SSBs and the number of SSBs in the DRS. For example, an SSB with an SCS of about 15 kHz may have a duration of about 0.5 millisecond (ms), whereas an SSB with an SCS of about 30 kHz may have a duration of about 0.25 ms. The BS 105 may transmit SSBs spaced apart in time or back-to-back within a DMTC window.

Due to the contention nature of the LBTs, access to the channel is unpredictable. Thus, the BS 105 may configure multiple transmission starting locations within a DMTC window for DRS transmission. The BS 105 may perform LBTs within a DMTC window based on the transmission starting locations and transmit a DRS upon a successful LBT. The BS 105 may broadcast information associated with the DMTC window and/or the potential DRS transmission starting locations within the DMTC window. A UE 115 may monitor for DRSs based on the broadcast information and perform initial network access and/or measurements (e.g., received signal strength indicator (RSSI) and/or beam measurements) based on the received DRSs.

In an embodiment, government bodies may regulate LBT operations in an unlicensed frequency band. For example, a regulation may specify a maximum allowable transmission duration a wireless communication device may transmit in a time period without performing an LBT and/or a maximum allowable number of LBT a wireless communication device may attempt within a time period. Accordingly, a BS 105 may configure DMTC windows and/or perform LBTs and/or DRS transmissions in the unlicensed frequency band based on the regulation. Mechanisms for accessing a shared channel for DRS transmissions are described in greater detail herein.

Figure 2:
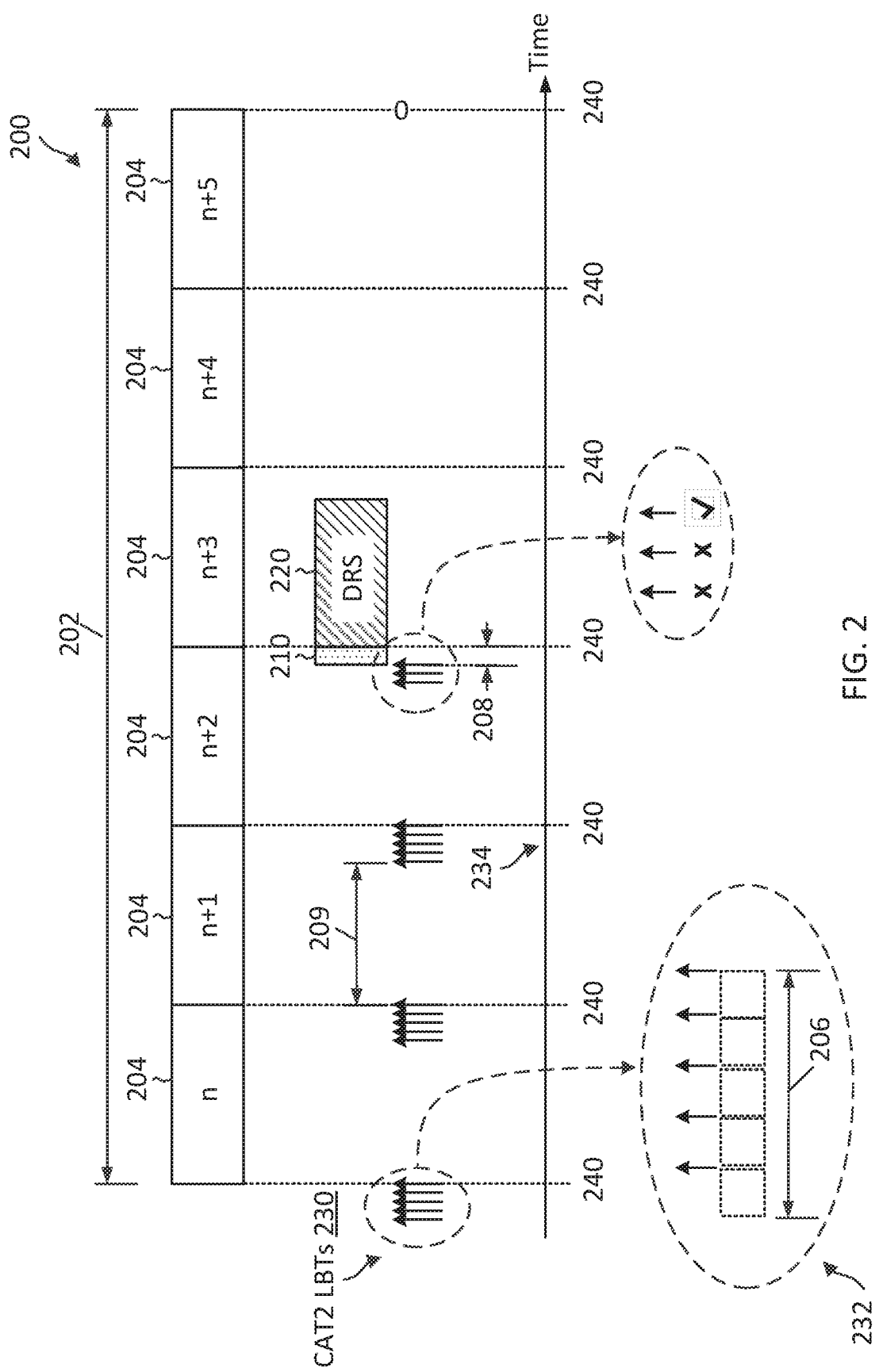
FIG. 2 is a timing diagram illustrating a discovery reference signal (DRS) transmission scheme with transmission starting locations aligned to transmission slot boundaries according to some embodiments of the present disclosure.

FIG. 2 is a timing diagram illustrating a DRS transmission scheme 200 with transmission starting locations aligned to transmission slot boundaries according to some embodiments of the present disclosure. The scheme 200 may be employed by BSs such as the BSs 105 and UEs such as the UEs 115 in a network such as the network 100 for communications. In particular, the BS may perform LBTs and transmit DRSs in a shared channel (e.g., a shared frequency band or an unlicensed frequency band) using the scheme 200. In FIG. 2, the x-axis represents time in some arbitrary units.

In the scheme 200, a BS (e.g., BS 105) may periodically transmit a DRS 220 to assist a UE (e.g., UE 115) in accessing the network and performing measurements (e.g., RSSIs and beam measurements). The DRS may include one or more SSBs, RMSI, and/or paging information. As an example, the DRS 220 may be transmitted using about twelve symbols (e.g., OFDM symbols) out of about fourteen symbols within a transmission slot 204. The transmission slot 204 may have any suitable duration and the DRS 220 may have any suitable periodicity. In an example, each transmission slot 204 may have a duration of about 1 ms and the BS may transmit the DRS 220 once in about every 10 ms, 20 ms, 40 ms, 80 ms, or 160 ms.

In an embodiment, the shared channel is over an unlicensed frequency band regulated by a regulating authority. In an example, the unlicensed frequency band may be a 2.4 GHz band or a 5 GHz band. The regulating authority may specify that a wireless node may transmit up to about 5 percent (%) of the time in a time period (e.g., of about 100 ms long) without performing an LBT. Thus, to comply with the regulation, the BS may transmit a DRS 220 in about every 20 ms. To be conservative, the BS may perform a CAT2 LBT 230 prior to each DRS 220 transmission. A CAT2 LBT 230 may be referred to as a one shot LBT. A CAT2 LBT 230 may include a channel listening or a CCA period, for example, of about 25 microsecond (μs). If the transmitting node does not detect any transmission in the channel during the CCA period, the transmitting node may transmit in the channel at the end of the CCA period. Conversely, if the transmitting node detects a transmission in the channel during the CCA period, the transmitting node may refrain from transmitting in the channel.

As an example, the BS may configure a DMTC window 202 with a duration of about 6 ms long and a periodicity of about 20 ms. Referring to the example where a transmission slot 204 may be about ms long, the DMTC window 202 may include about six transmission slots 204. The BS may transmit a DRS 220 in each DMTC window 202. The BS may restrict the starting location of a DRS 220 to be at the boundary of a transmission slot 204. The transmission slots 204 are shown with indices n, n+1, n+2, n+3, n+4, and n+5. The allowable transmission starting locations for a DRS 220 are shown as 240 located at the start of each transmission slot 204 within the DMTC window 202. The BS may perform CAT2 LBTs 230 in the DMTC window based on the transmission starting locations 240 and transmit a DRS 220 upon a successful CAT2 LBT 230.

Since the DRS 220 transmission is opportunistic (e.g., due to the CAT2 LBT 230), the BS may transmit a DRS 220 in any of the transmission slot 204 based on a successful CAT2 LBT 230. Further, since a DRS 220 spans about twelve symbols corresponding to about 860 μs, which is less than 1 ms as allowed by the regulation, the BS may transmit a filler signal 210 with a duration up to about 100 μs in length before a DRS 220. The filler signal 210 may include filler data, which may not include any useful information. The transmission of a filler signal 210 is to occupy the channel so that another node may not grab the channel and start a transmission before the next transmission starting location 240. With a maximum filler duration of about 100 μs, the BS may perform up to about five CAT2 LBTs 230 of 25 μs each (shown as arrows) before the start of a transmission slot 204. In other words, the BS may perform a maximum of about thirty CAT2 LBTs 230 in a DMTC window 202.

The CAT2 LBTs 230 before each transmission slot 204 may be similar. The CAT2 LBTs 230 before the transmissions slot 204 indexed (n) is expanded to provide a more detailed view. In the expanded view 232, each dotted-line box represents an CAT2 LBT 230 attempt with a listening period of about 25 μs. Each arrow marks the end of an CAT2 LBT 230 when a transmission may start if the CAT2 LBT 230 is a pass. The five CAT2 LBTs 230 may span a duration 206 of about 100 μs. If the BS passes an CAT2 LBT 230 before the start of a transmission slot 204, the BS may transmit a filler signal 210 until the beginning of the transmission slot 204 and begin the transmission of a DRS 220 at the beginning of the transmission slot 204. In other words, the BS may start to perform CAT2 LBT 230 about 100 μs before the start of a transmission slot 204. If the BS passes an CAT2 LBT 230 in a first attempt, the BS may transmit a filler signal 210 of about 100 μs long before a DRS 220. If the BS passes an CAT2 LBT in a second attempt, the BS may transmit a filler signal 210 of about 75 μs long before a DRS 220. If the BS passes an CAT2 LBT in a third attempt, the BS may transmit a filler signal 210 of about 50 μs long before a DRS 220. If the BS passes an CAT2 LBT in a fourth attempt, the BS may transmit a filler signal 210 of about 25 μs long before a DRS 220. If the BS passes an CAT2 LBT in a fifth attempt (e.g., aligned to the boundary of the transmissions slot 204), the BS may transmit a DRS 220 without a preceding filler signal 210.

As an example, the BS performs CAT2 LBTs 230 in the DMTC window 202 as shown by the arrows before each transmission slot 204 indexed (n), (n+1), (n+2), and (n+3). The BS fails in each CAT2 LBT 230 attempt before the transmission slots 204 indexed (n), (n+1), and (n+2). The BS also fails in the first two CAT2 LBT 230 attempts before the beginning of the transmission slot 204 indexed (n+3). However, the BS passes an CAT2 LBT 230 at a third attempt before the beginning of the transmission slot 204 indexed (n+3). The results of the CAT2 LBTs 230 for the transmission slot 204 indexed (n+3) is expanded to provide a more detailed view. In the expanded view 234, the first two CAT2 LBT 230 attempts result in failures as shown by the cross symbols and the third CAT2 LBT 230 attempt results in a pass as shown by the checkmark. After passing the CAT2 LBT 230 in the third attempt, the BS transmits a filler signal 210 until the beginning of the transmission slot 204 indexed (n+3) and transmits a DRS 220 beginning at the boundary of the transmission slot 204 indexed (n+3). The filler signal 210 may include a duration 208 of about 50 μs.

In an embodiment, the UE may monitor for DRSs 220 from the BS at the boundaries of the transmission slots 204. For example, the UE may determine whether a DRS 220 is received from the BS by performing signal detection and/or decoding beginning at each transmission starting location 240 within a DMTC window 202.

One drawback of the scheme 200 may be that the transmission starting locations 240 are restricted to be in alignment with the transmission slot 204 boundaries, leaving a substantially long period 209 in the middle of a transmission slot 204 where another node contending for the channel may potentially grab the channel and start a transmission. If the other node started a transmission during the period 209, the CAT2 LBT 230 for a next transmission slot 204 may result in a failure. As such, the BS may have a lower probability of winning a contention in the channel for DRS transmission.

Accordingly, the present disclosure provides techniques providing a finer DRS transmission starting location granularity than a transmission slot, and yet satisfying constraints and/or parameters (e.g., imposed by regulations) of an unlicensed frequency band or shared frequency band.

Figure 3:
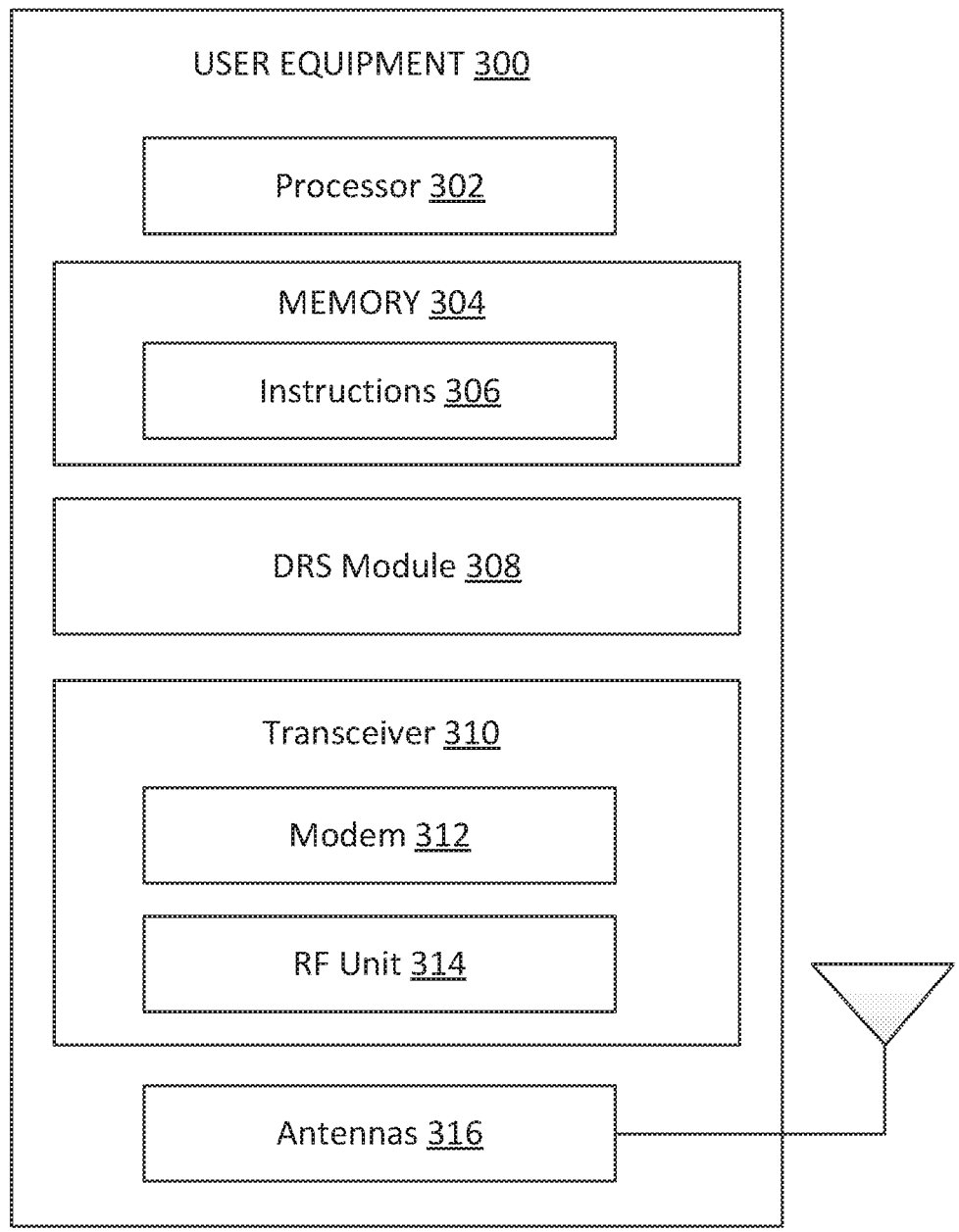
FIG. 3 is a block diagram of a user equipment (UE) according to some embodiments of the present disclosure.

FIG. 3 is a block diagram of an exemplary UE 300 according to embodiments of the present disclosure. The UE 300 may be a UE 115 in the network 100 as discussed above in FIG. 1. As shown, the UE 300 may include a processor 302, a memory 304, a DRS communication module 308, a transceiver 310 including a modem subsystem 312 and a radio frequency (RF) unit 314, and one or more antennas 316. These elements may be in direct or indirect communication with each other, for example via one or more buses.

The processor 302 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 304 includes a non-transitory computer-readable medium. The memory 304 may store, or have recorded thereon, instructions 306. The instructions 306 may include instructions that, when executed by the processor 302, cause the processor 302 to perform the operations described herein with reference to the UEs 115 in connection with embodiments of the present disclosure, for example, aspects of FIG. 5-11. Instructions 306 may also be referred to as program code. The program code may be for causing a wireless communication device to perform these operations, for example by causing one or more processors (such as processor 302) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The DRS communication module 308 may be implemented via hardware, software, or combinations thereof. The DRS communication module 308 may be implemented as a processor, circuit, and/or instructions 306 stored in the memory 304 and executed by the processor 302. In some examples, the DRS communication module 308 can be integrated within the modem subsystem 312. For example, the DRS communication module 308 can be implemented by a combination of software components (e.g., executed by a DSP or a general processor) and hardware components (e.g., logic gates and circuitry) within the modem subsystem 312.

The DRS communication module 308 may be used for various aspects of the present disclosure, for example, aspects of FIGS. 2 and 5-11. The DRS communication module 308 is configured to receive a DRS configuration from a BS (e.g., BS 105 in FIG. 1). The DRS configuration may indicate DMTC window timing information (e.g., DMTC window duration and/or periodicity of the DMTC windows) and potential DRS transmission starting locations (e.g., timing locations) within the DMTC windows. The DRS transmission starting locations may be aligned to boundaries of the transmission slots of the DMTC window or offset from the transmission slot boundaries. The DRS communication module 308 is further configured to monitor for DRSs based on the DRS configuration. For example, the DRS communication module 308 may perform hypotheses at the potential DRS transmission starting location to decode for DRS. Mechanisms for DRS communications are described in greater detail herein.

As shown, the transceiver 310 may include the modem subsystem 312 and the RF unit 314. The transceiver 310 can be configured to communicate bi-directionally with other devices, such as the BSs 105. The modem subsystem 312 may be configured to modulate and/or encode the data from the memory 304 and/or the DRS communication module 308 according to a modulation and coding scheme (MCS), e.g., a low-density parity check (LDPC) coding scheme, a turbo coding scheme, a convolutional coding scheme, a digital beamforming scheme, etc. The RF unit 314 may be configured to process (e.g., perform analog to digital conversion or digital to analog conversion, etc.) modulated/encoded data from the modem subsystem 312 (on outbound transmissions) or of transmissions originating from another source such as a UE 115 or a BS 105. The RF unit 314 may be further configured to perform analog beamforming in conjunction with the digital beamforming. Although shown as integrated together in transceiver 310, the modem subsystem 312 and the RF unit 314 may be separate devices that are coupled together at the UE 115 to enable the UE 115 to communicate with other devices.

The RF unit 314 may provide the modulated and/or processed data, e.g. data packets (or, more generally, data messages that may contain one or more data packets and other information), to the antennas 316 for transmission to one or more other devices. The antennas 316 may further receive data messages transmitted from other devices. The antennas 316 may provide the received data messages for processing and/or demodulation at the transceiver 310. The antennas 316 may include multiple antennas of similar or different designs in order to sustain multiple transmission links. The RF unit 314 may configure the antennas 316.

In an embodiment, the UE 300 can include multiple transceivers 310 implementing different RATs (e.g., NR and LTE). In an embodiment, the UE 300 can include a single transceiver 310 implementing multiple RATs (e.g., NR and LTE). In an embodiment, the transceiver 310 can include various components, where different combinations of components can implement RATs.

Figure 4:
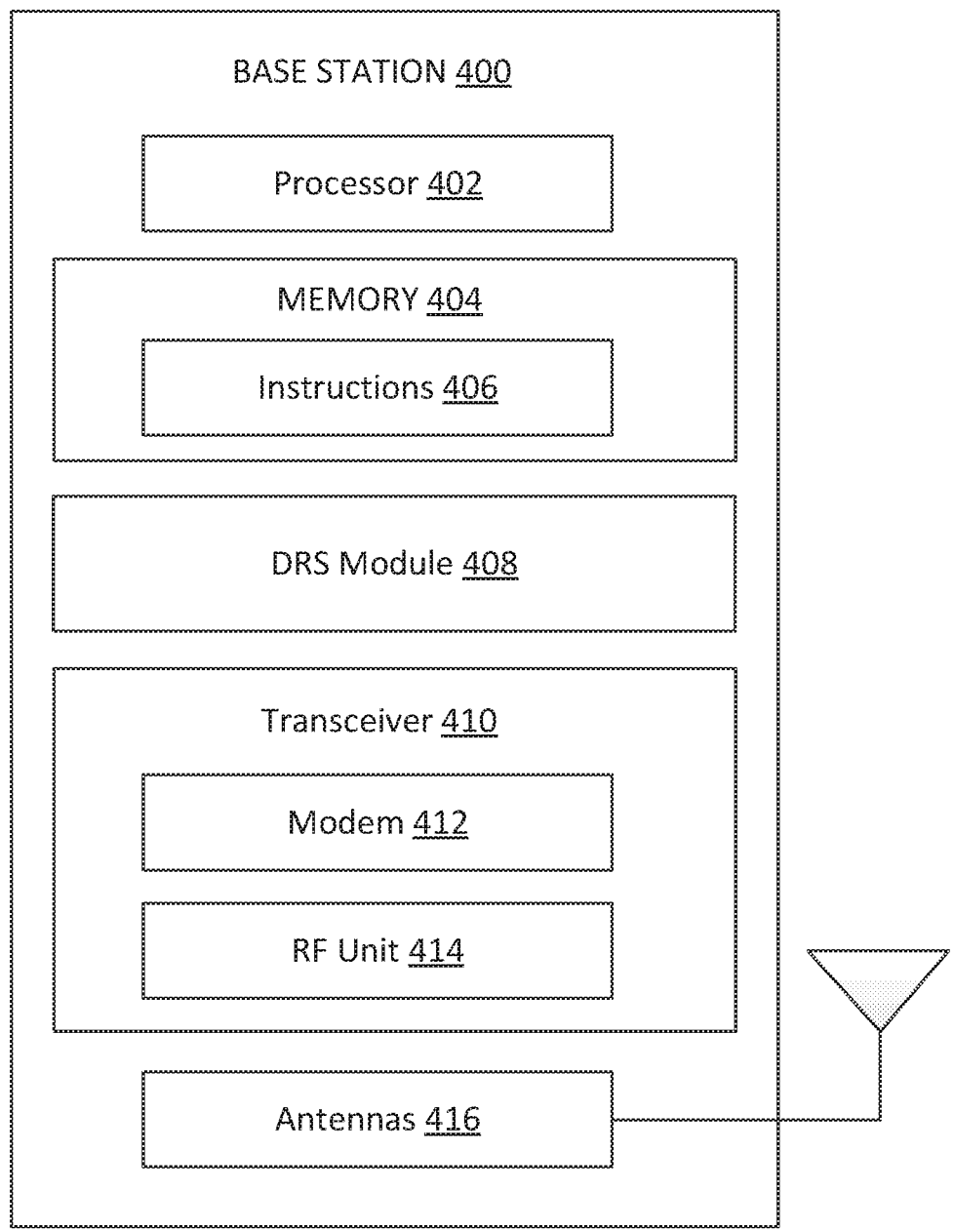
FIG. 4 is a block diagram of an exemplary base station (BS) according to some embodiments of the present disclosure.

FIG. 4 is a block diagram of an exemplary BS 400 according to embodiments of the present disclosure. The BS 400 may be a BS 105 in the network 100 as discussed above in FIG. 1. As shown, the BS 400 may include a processor 402, a memory 404, a DRS communication module 408, a transceiver 410 including a modem subsystem 412 and a RF unit 414, and one or more antennas 416. These elements may be in direct or indirect communication with each other, for example via one or more buses.

The processor 402 may have various features as a specific-type processor. For example, these may include a CPU, a DSP, an ASIC, a controller, a FPGA device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some embodiments, the memory 404 may include a non-transitory computer-readable medium. The memory 404 may store instructions 406. The instructions 406 may include instructions that, when executed by the processor 402, cause the processor 402 to perform operations described herein, for example, aspects of FIGS. 2 and 5-11. Instructions 406 may also be referred to as code, which may be interpreted broadly to include any type of computer-readable statement(s) as discussed above with respect to FIG. 3.

The DRS communication module 408 may be implemented via hardware, software, or combinations thereof. The DRS communication module 408 may be implemented as a processor, circuit, and/or instructions 406 stored in the memory 404 and executed by the processor 402. In some examples, the DRS communication module 408 can be integrated within the modem subsystem 412. For example, the DRS communication module 408 can be implemented by a combination of software components (e.g., executed by a DSP or a general processor) and hardware components (e.g., logic gates and circuitry) within the modem subsystem 412.

The DRS communication module 408 is configured to transmit a DRS configuration and transmit DRSs based on the DRS configuration to facilitate initial access and cell measurements by UEs (e.g., UEs 115 in FIG. 1). The DRS configuration may indicate DMTC window timing information (e.g., a DMTC window duration and/or a DMTC window periodicity) and potential DRS transmission starting locations (e.g., timing locations) within the DMTC windows. The transmission starting locations may be aligned to boundaries of transmission slots of the DMTC window or offset from the transmission slot boundaries.

In some examples, the DRS communication module 408 is further configured to configure the transmission starting locations based on a number of CAT2 LBT attempts allowable within the DMTC window, predetermined SSB locations and/or RMSI control information locations within a transmission slot, the SCS used for transmitting the DRS, the number of SSBs in the DRS, the number of beams used for transmitting the DRS, and/or the transmission duration of the DRS. In some examples, the DRS communication module 408 is further configured to determine the number of transmission starting locations within the DMTC window based on the duration of the DMTC window.

In some examples, the DRS communication module 408 is further configured to distribute the CAT2 LBT attempts across the transmission starting locations by associating each DRS transmission starting location with one or more of the CAT2 LBTs. The DRS communication module 408 can perform CAT2 LBTs multiple times before a DRS transmission starting location, where a last CAT2 LBT attempt may correspond to the DRS transmission starting location. When the DRS communication module 408 passes a CAT2 LBT before the last attempt, the DRS communication module 408 may transmit a filler signal or a reference signal (e.g., providing channel information and/or time/frequency/phase tracking information) until the DRS transmission starting location and transmit a DRS beginning at the DRS transmission starting location.

In some examples, the DRS communication module 408 is further configured to determine the number of allowable CAT2 LBTs within a DMTC window and/or the locations of the CAT2 LBTs in the DMTC window based on an SCS of the DRS, a number of SSBs in the DRS, a number of beams used for transmitting the DRS, a transmission duration of the DRS, a periodicity of the DMTC window.

In some examples, the DRS communication module 408 is further configured to perform a CAT4 LBT in a DMTC window upon a CAT2 LBT failure in the DMTC window and transmit a DRS when the CAT4 LBT is a pass. In some examples, the DRS communication module 408 can limit the CAT4 LBTs to certain locations within the DMTC windows and include the CAT4 LBT locations in the DRS configuration to facilitate DRS decoding at UEs.

As shown, the transceiver 410 may include the modem subsystem 412 and the RF unit 414. The transceiver 410 can be configured to communicate bi-directionally with other devices, such as the UEs 115 and/or another core network element. The modem subsystem 412 may be configured to modulate and/or encode data according to a MCS, e.g., a LDPC coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data from the modem subsystem 412 (on outbound transmissions) or of transmissions originating from another source such as a UE 115 or 300. The RF unit 414 may be further configured to perform analog beamforming in conjunction with the digital beamforming. Although shown as integrated together in transceiver 410, the modem subsystem 412 and/or the RF unit 414 may be separate devices that are coupled together at the BS 105 to enable the BS 105 to communicate with other devices.

The RF unit 414 may provide the modulated and/or processed data, e.g. data packets (or, more generally, data messages that may contain one or more data packets and other information), to the antennas 416 for transmission to one or more other devices. This may include, for example, transmission of information to complete attachment to a network and communication with a camped UE 115 or 400 according to embodiments of the present disclosure. The antennas 416 may further receive data messages transmitted from other devices and provide the received data messages for processing and/or demodulation at the transceiver 410. The antennas 416 may include multiple antennas of similar or different designs in order to sustain multiple transmission links.

In an embodiment, the BS 400 can include multiple transceivers 410 implementing different RATs (e.g., NR and LTE). In an embodiment, the BS 400 can include a single transceiver 410 implementing multiple RATs (e.g., NR and LTE). In an embodiment, the transceiver 410 can include various components, where different combinations of components can implement RATs.

Figure 5:
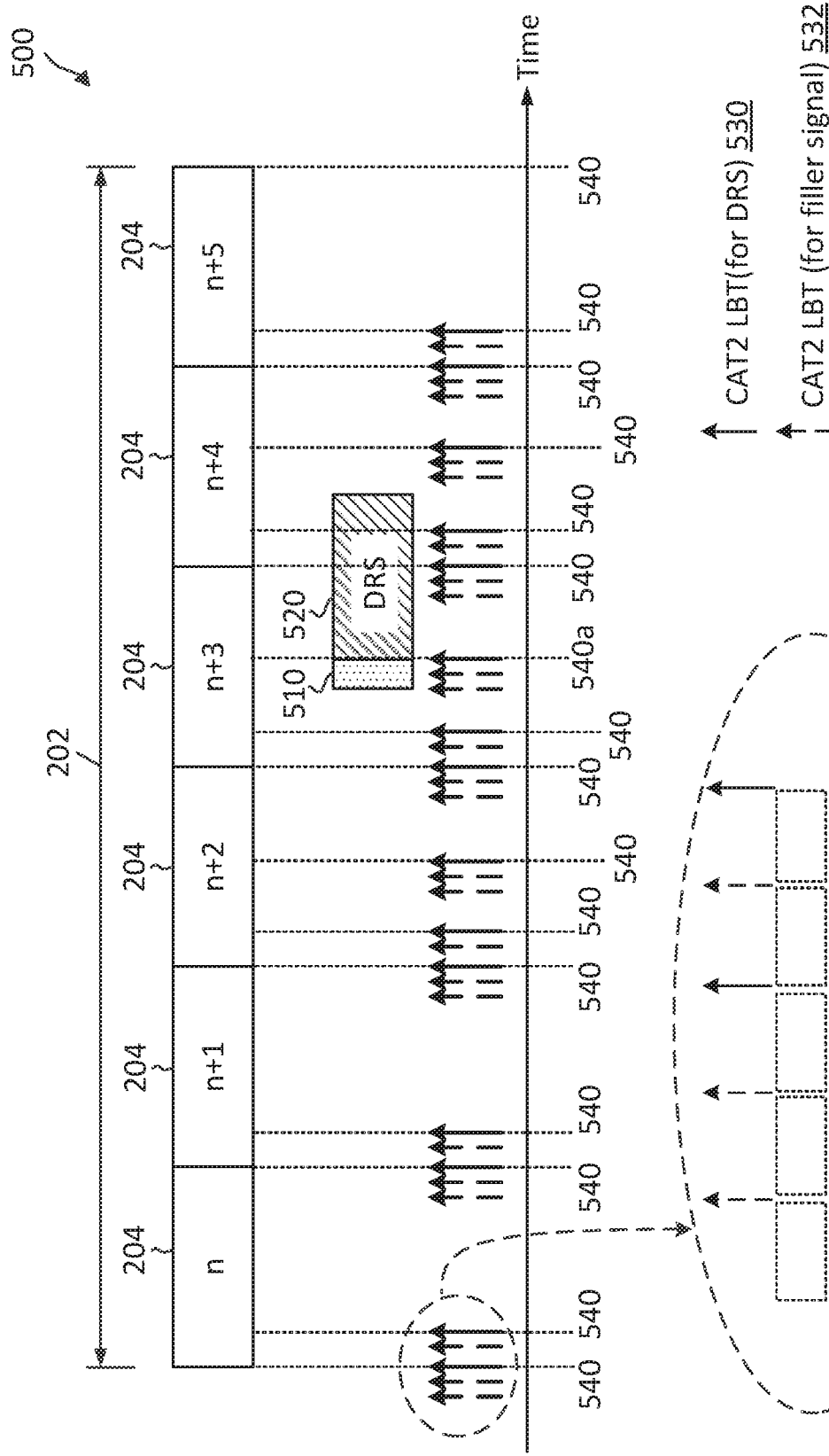
FIG. 5 is a timing diagram illustrating a DRS transmission scheme with a transmission start location granularity finer than a transmission slot according to some embodiments of the present disclosure.

FIG. 5 is a timing diagram illustrating a DRS transmission scheme 500 with a transmission start location granularity finer than a transmission slot according to some embodiments of the present disclosure. The scheme 500 may be employed by BSs such as the BSs 105 and UEs such as the UEs 115 in a network such as the network 100 for communications. In particular, the BS may perform LBTs and transmit DRSs in a shared channel (e.g., a shared frequency band or an unlicensed frequency band) using the scheme 500. In FIG. 5, the x-axes represent time in some arbitrary units. The scheme 500 is illustrated using the same DMTC window structure as the scheme 200 and may use the same reference numerals as in FIG. 2 for simplicity's sake. The scheme 500 provides a finer transmission starting locations than the scheme 200. The scheme 500 does not restrict DRS transmission starting locations to be aligned to the boundaries of transmission slots 204 within a DMTC window 202.

In the scheme 500, a BS (e.g., BS 105) may configure periodic DMTC windows 202 for DRS transmission to assist UEs (e.g., UEs 115) in performing initial network access and signal measurements. The BS may transmit a DRS 520 in each DMTC window 202. The DRS 520 may include one or more SSBs as described in greater detail below in FIG. 6. The BS may configure multiple potential DRS transmission starting locations 540 within a DMTC window 202. A DRS transmission starting location 540 can be within a transmission slot 204 or aligned to the boundary of a transmission slot 204. Thus, in some instances, the DRS transmission starting locations 540 can be a few symbols (e.g., about 1, 2, 3, 4, 5, 6, or 7) apart. The BS may perform one or more CAT2 LBTs before each DRS transmissions starting location 540. The BS may transmit a DRS 520 beginning at any one of the DRS transmission starting locations 540 within the DMTC window 202 based on the CAT2 LBTs.

In FIG. 5, the CAT2 LBTs 530 that are associated with a transmission of a DRS 520 are shown as solid arrows and the CAT2 LBTs 532 that are associated with a transmission of a filler signal 510 are shown as dashed arrows. The CAT2 LBTs 530 and the CAT2 LBTs 532 are substantially similar to the CAT2 LBTs 230 in FIG. 2, where each CAT2 LBT 530 or CAT2 LBT 532 may include a CCA period (e.g., of about 25 µs). The CAT2 LBTs 530 and 532 near the beginning of the transmission slot 204 indexed (n) is expanded to provide a more detailed view. In the expanded view 534, each CAT2 LBT 530 or CAT2 LBT 532 includes a CCA period (shown as a dotted-line box) beginning at a LBT starting location 542, where each solid arrow or dashed arrow marks the end of a corresponding CAT2 LBT 530 or CAT2 LBT 532, respectively. The BS may perform CCA during the CCA periods based on energy detection and/or signal detection. For example, the BS may determine whether the channel is available or not based on signal energy measured from the channel in comparison to an energy threshold. Alternatively or additionally, the BS may monitor for a specific reservation signal (e.g., a preamble signal) to determine whether another is transmitting in the channel. It should be noted that the locations of the CAT2 LBT 530 and/or 532 in the DMTC window 202 are for illustration purpose and may be alternatively distributed across the DMTC window 202 in any suitable manner.

In the scheme 500, the BS may start to perform a CAT2 LBT at an earlier time than a DRS transmission starting location 540. As shown, the BS may perform one or more CAT2 LBTs 532 before each DRS transmission starting location 540 and/or a CAT2 LBT 530 for each DRS transmission starting location 540 within the DMTC window 202. The BS may start a transmission in the channel as soon as a CAT2 LBT 532 or a CAT2 LBT 530 passes so that another node may not grab the channel and start a transmission. For example, if the BS passes a CAT2 LBT 532 before a DRS transmission starting location 540, the BS may transmit a filler signal 510 (e.g., including filler data with no useful information) until the DRS transmission starting location 540 and transmit a DRS 520 beginning at the DRS transmission location 540. In some instances, the BS may transmit one or more reference signals instead of a filler signal 510. The reference signal can be a CSI-RS or a tracking reference signal (TRS). The CSI-RS can provide a UE with channel information. The TRS can facilitate time, frequency, and/or phase tracking at a UE. The total duration of transmission including the filler signal 510 and the DRS 520 may not exceed the regulation (e.g., about 1 ms).

If the BS fails a CAT2 LBT 532, the BS may reattempt another CAT2 LBT, which may be a CAT2 LBT 532 or a CAT2 LBT 530. If the BS passes a CAT2 LBT 530, the BS starts to transmit a DRS 520 at a corresponding DRS transmission starting location 540. If the BS fails a CAT2 LBT 530, the BS may wait till a next LBT starting location 542 to reattempt a CAT2 LBT.

As an example, the BS fails in each LBT 530 and 532 attempt before the second DRS transmission starting locations 540 in the transmission slots 204 indexed (n+3), but a subsequent CAT2 LBT 532 attempt results in a pass. The BS transmits a filler signal 510 until the beginning of the next DRS transmission starting location 540a and transmits a DRS 520 beginning at the DRS transmission starting location 540a.

In an embodiment, the BS may determine the number of DRS transmission starting locations 540 within a DMTC window 202 based on certain regulations. For example, the BS may transmit the DRSs 520 over an unlicensed frequency band (e.g., a 2.4 GHz band or a 5 GHz band) regulated by a regulating authority. To facilitate sharing of the unlicensed frequency band among multiple wireless devices, such as NR-U devices (e.g., BSs 105 and 400 and UEs 115 and 300) and WiFi devices, the regulation may specify a maximum allowable number of CAT2 LBTs (e.g., the CAT2 LBTs 530 and 532) a wireless device may perform in the unlicensed frequency band within a time period.

In an embodiment, the number of CAT2 LBT attempts (e.g., the CAT2 LBTs 530 and 532) within a DMTC window 202 is predetermined (e.g., specified by a standard). The CAT2 LBT starting locations 542 for a DRS 520 transmission may be selected from a larger set of allowable CAT2 LBTs starting locations within the DMTC window 202. As an example, a transmission may start at every 0.25 ms time interval over a 5 ms time period. Thus, a DMTC window (e.g., the DMTC window 202) with a duration of 5 ms may include about twenty DRS transmission starting locations (e.g., the DRS transmission starting locations 540). In a first example, the BS may select ten DRS transmission starting locations from the twenty DRS transmission starting locations allowed in the DMTC window. In a second example, a certain wireless communication protocol or standard may specify ten DRS transmission starting locations out of the twenty DRS transmission locations allowed in the DMTC window. The BS may perform a CAT2 LBT at each of the ten DRS transmission starting locations 540. When the BS passes a CAT2 LBT, the BS may transmit a DRS 520 at a corresponding DRS transmissions starting location. After transmitting the DRS 520, the BS may wait for a next DMTC window and repeat the CAT2 LBTs and DRS transmission.

To reduce DRS detection and/or decoding complexity at a UE, the BS may select a subset of the CAT2 LBT staring locations in the DMTC window for actual DRS transmissions. The remaining CAT2 LBT starting locations may be used for transmitting a filler signal (e.g., the filler signals 510) and/or a reference signal until the actual DRS transmission starting location begins. The total duration of transmission including the filler signal 510 and the DRS 520 may not exceed the regulation (e.g., about 1 ms). In general, N number of CAT2 LBT starting locations may be selected from a set of allowable CAT2 LBT starting locations within a DMTC window, a subset of the N CAT2 LBT starting locations may be used for actual DRS transmissions, and remaining CAT2 LBT starting locations in the N CAT2 LBT starting locations may be used for filler signal and/or reference signal transmissions.

Figure 6:
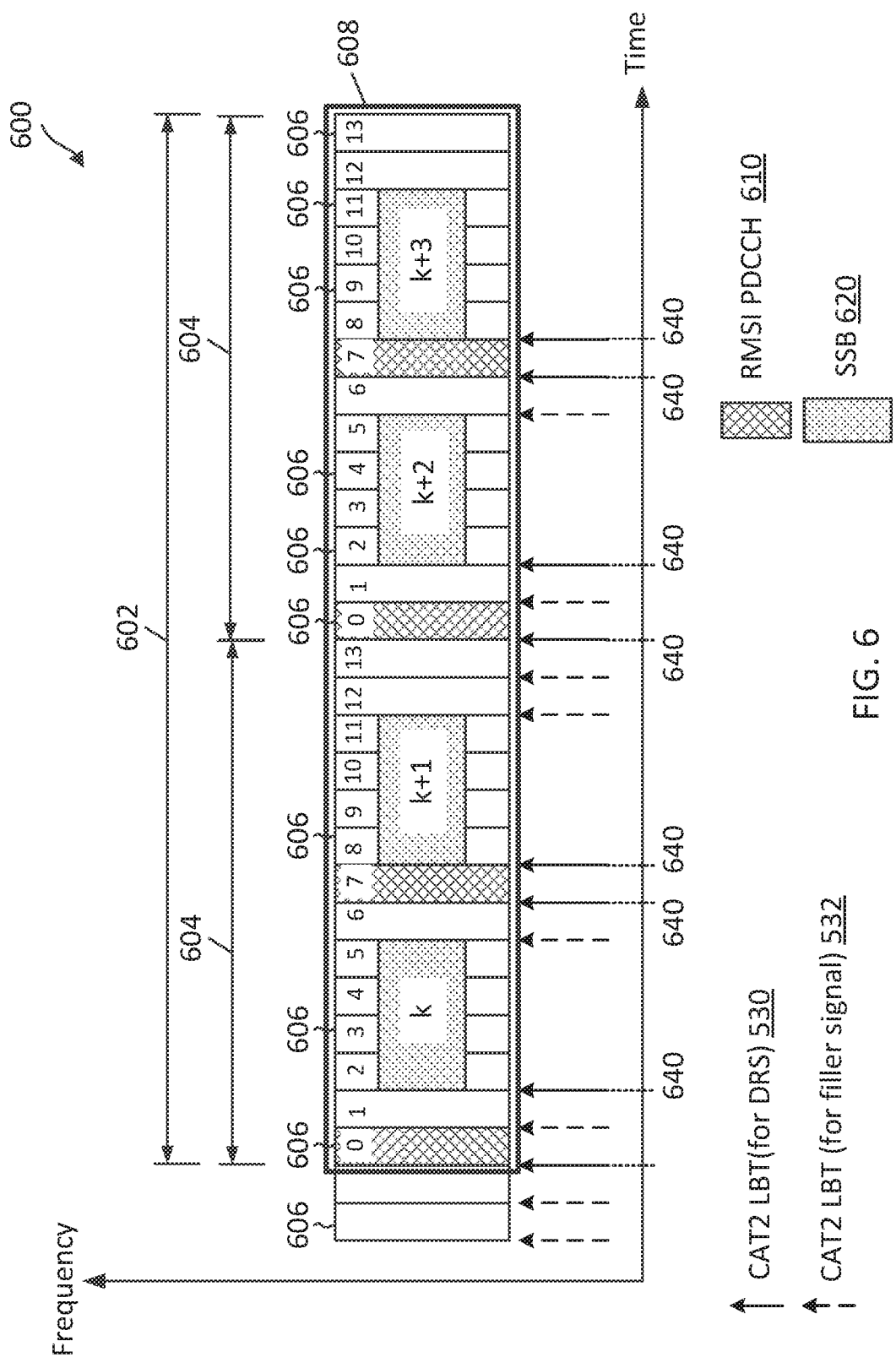
FIG. 6 is a timing diagram illustrating a DRS transmission scheme with a transmission start location granularity finer than a transmission slot according to some embodiments of the present disclosure.

FIG. 6 is a timing diagram illustrating a DRS transmission scheme 600 with a transmission start location granularity finer than a transmission slot according to some embodiments of the present disclosure. The scheme 600 may be employed by BSs such as the BSs 105 and UEs such as the UEs 115 in a network such as the network 100 for communications. In particular, the BS may perform LBTs and transmit DRSs in a shared channel (e.g., a shared frequency band or an unlicensed frequency band) using the scheme 600. In FIG. 6, the x-axis represents time in some arbitrary units, and the y-axis represents frequency in some arbitrary units. The scheme 600 may be substantially similar to the scheme 500 and provide a more detailed view of a DRS transmission and example potential start locations of a DRS within a subframe duration of about 1 ms.

The scheme 600 shows a DRS 608 including a duration 602 of about 1 ms and an SCS of about 30 kHz SCS. The DRS 608 may correspond to the DRS 520 of FIG. 5. For a 30 kHz SCS, a DRS 608 with a transmission duration 602 of about 1 ms long may include about two transmission slots 604, each including about fourteen symbols 606 (e.g., OFDM symbols). The symbols 606 in each slot 604 are shown with indices 0 to 13. As an example, the DRS 608 may include about four SSBs 620. The SSBs 620 are shown with indices k, k+1, k+2, and k+3. Each SSB 620 may include a PSS, an SSS, and/or a PBCH signal carrying system information (e.g., a MIB) and may include a duration of about four symbols 606. In some instances, the BS may transmit each SSB 620 in a different beam direction. Thus, the SSBs 620 can provide a UE with timing information and/or beam information. In some examples, the DRS 608 may also include RMSIs and/or paging information. For example, the DRS 608 may include an RMSI PDCCH signal 610 providing scheduling information for RMSIs and/or paging information in the DRS 608.

It should be noted that FIG. 6 illustrates a BS transmitting an RMSI PDCCH signal 610 and an SSB 620 in each half of a transmissions slot 604 for simplicity of illustration and discussion. However, a DRS may include any suitable number of SSBs 620 (e.g., between about 1 to about 8) and the SSBs 620 and/or the RMSI PDCCH signals 610 may be located at any suitable symbols 606 within the transmission slots 604. In addition, in some embodiments, an RMSI PDCCH signal 610 may span two symbols 606 instead of one symbol 606 as shown. In general, the BS may transmit the SSBs 620 back-to-back or spaced apart within a DMTC window (e.g., the DMTC window 202). Further, in some instances, the BS may transmit an SSB 620 in a symbol 606 scheduled for RMSI transmission. The BS may puncture the RMSI to allow for the transmission of the SSB 620.

A DRS transmission starting location 640 may refer to a starting symbol 606 location of an RMSI PDCCH signal 610 or an SSB 620. In other words, the DRS transmission starting locations 640 are dependent on the transmission boundaries of the RMSI PDCCH signals 610 and SSBs 620. The BS may attempt a CAT2 LBT 530 and one or more CAT2 LBTs 532 for each DRS transmission starting location 640. While not shown, each CAT2 LBT 530 or 532 may have a CCA period (e.g., of about 25 µs) ending at a time corresponding to a solid arrow or a dashed arrow, respectively, as shown in FIG. 5. Similar to the schemes 200 and 500, if the BS passes a CAT2 LBT before a DRS transmission starting location 640, the BS may transmit a filler signal (e.g., the filler signals 210 and 510) and/or a reference signal (e.g., a CSI-RS or a TRS) until the start of the DRS transmission starting location 640.

In an embodiment, the starting symbols 606 for the RMSI PDCCH signals 610 and/or the SSBs 620 are predetermined. Thus, the BS may determine DRS transmission starting locations 640 based on the predetermined starting symbols 606 for the RMSI PDCCH signals 610 and SSBs 620. The BS may determine the starting locations for the CAT2 LBTS 530 and 532 attempts based on the DRS transmission starting locations 640. The BS may distribute the CAT2 LBTs 532 attempts across the DRS transmission starting locations 640 in any suitable manner. For example, some DRS transmission starting locations 640 may have one CAT2 LBT 532 attempt preceding a CAT2 LBT 530 attempt, while some other DRS transmission starting locations may have multiple CAT2 LBTs 532 attempts preceding a CAT2 LBT 530 attempt. In general, the BS may determine the DRS transmission starting locations 640 based on the SCS of the SSBs 620, the number of SSBs 620 within a DRS 608, the duration of the DRS 608, and/or the duration of a DMTC window (e.g., the DMTC window 202).

Depending on when the BS passes a CAT2 LBT 530 or 532, the BS may begin a DRS transmission with a different SSB 620. In an example, when the BS passes a CAT2 LBT 530 or 532 associated with the SSB 620 indexed (k), the BS may transmit the SSBs 620 in the order as shown from index (k) to index (k+3). In an example, when the BS passes a CAT2 LBT 530 or 532 associated with the SSB 620 indexed (k+1), the BS may transmit the SSBs 620 in the order of (k+1), (k+2), (k+3), and (k). In an example, when the BS passes a CAT2 LBT 530 or 532 associated with the SSB 620 indexed (k+2), the BS may transmit the SSBs 620 in the order of (k+2), (k+3), (k), and (k+1). In an example, when the BS passes a CAT2 LBT 530 or 532 associated with the SSB 620 indexed (k+3), the BS may transmit the SSBs 620 in the order of (k+3), (k), (k+1), and (k+2).

In an embodiment, the duration 602 of the DRS 608 may be determined based on a certain regulation. For example, a regulation may specify a maximum duration a wireless device is allowed to transmit in a frequency band within a time period. Depending on the SCS of the DRS 608 or SSBs 620, the DRS transmission starting locations 640 may vary. For example, for an SCS of about 15 kHz, a 1 ms duration may include one transmission slot 604 with about fourteen symbols 606 instead of two transmission slots 604 as shown in FIG. 6. Thus, a DRS with a 30 kHz SCS may include two SSBs 620 instead of four SSBs 620 as shown. Thus, the number of DRS transmission starting locations 640 and/or the DRS transmission starting locations may vary depending on the SCS of the SSBs 620, the number of SSBs 620 in the DRS 608, the duration 602 of the DRS 608, and/or the duration of a DMTC window (e.g., DMTC window 202). Similarly, since CAT2 LBTs (e.g., the CAT2 LBTs 530 and 532) are associated with the DRS transmission starting locations 640, the number of CAT2 LBTs and/or the CAT2 LBT starting locations (e.g., the CAT2 LBT starting locations 542) may vary depending on the SCS of the SSBs 620, the number of SSBs 620 in the DRS 608, the duration 602 of the DRS 608, and/or a duration of a DMTC window.

Figure 7:
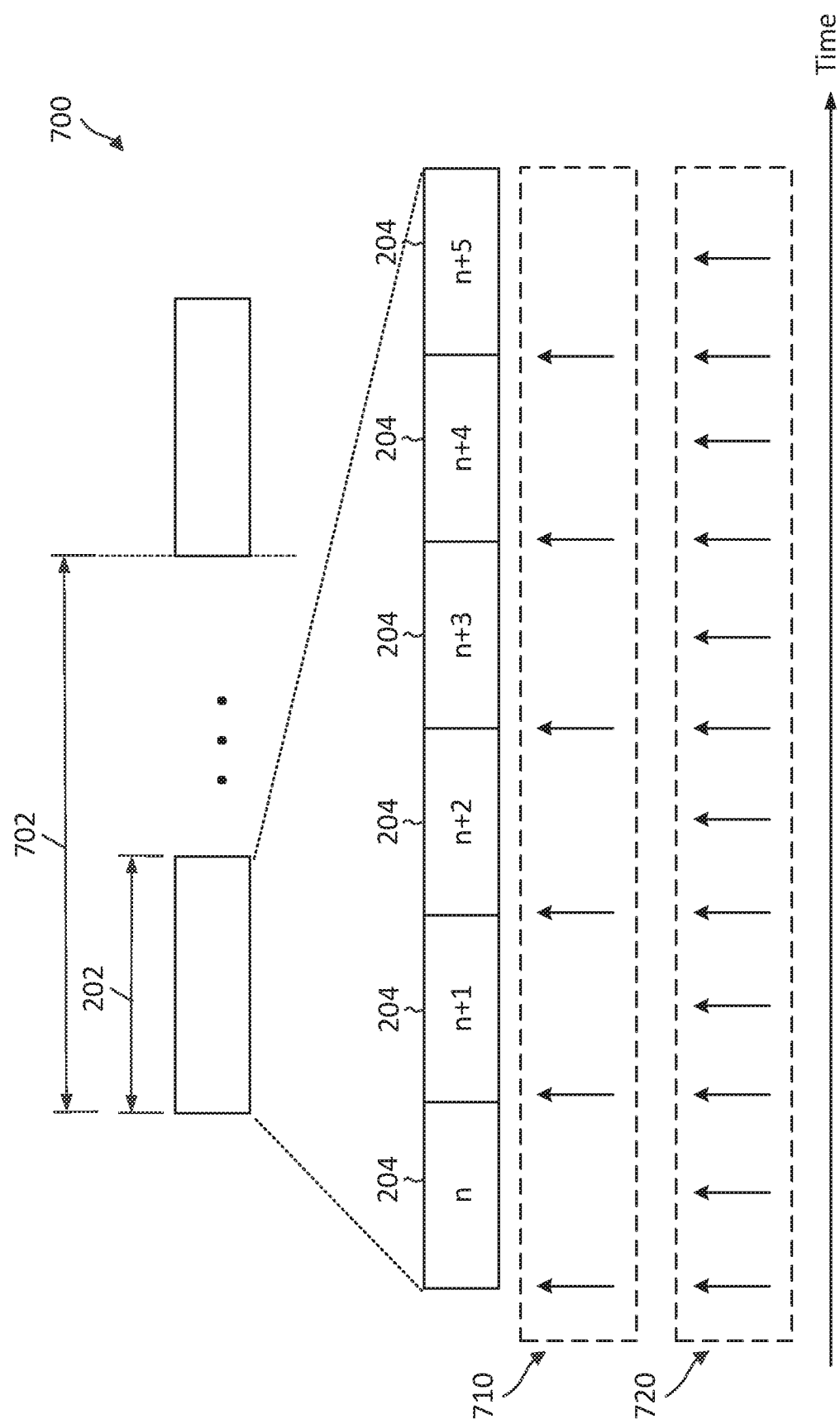
FIG. 7 is a timing diagram illustrating a DRS transmission scheme dependent on a number of category 2 (CAT2) listen-before-talk (LBT) attempts over a time period according to some embodiments of the present disclosure.

FIG. 7 is a timing diagram illustrating a DRS transmission scheme 700 dependent on a number of CAT2 LBT attempts over a time period according to some embodiments of the present disclosure. The scheme 700 may be employed by BSs such as the BSs 105 and UEs such as the UEs 115 in a network such as the network 100 for communications. In particular, the BS may perform LBTs and transmit DRSs in a shared channel (e.g., a shared frequency band or an unlicensed frequency band) using the scheme 700. In FIG. 7, the x-axis represents time in some arbitrary units. The scheme 700 is illustrated using the same DMTC window structure as in the schemes 200 and 500 and may use the same reference numerals as in FIGS. 2 and 5 for simplicity's sake. In the scheme 700, the number of CAT2 LBTs 730 (e.g., the CAT2 LBTs 530 and/or 532) in a time period is preconfigured or predetermined. Thus, the number of CAT2 LBTs 730 allowed within a DMTC window 202 may be dependent on the DMTC period 702 (e.g., the repeating interval) of the DMTC window 202.

As an example, six CAT2 LBT 730 attempts are allowed over a time period of 10 ms. In a configuration 710, the DMTC period 702 is 10 ms long, and thus six CAT2 LBT 730 attempts are allowed in the DMTC window 202. In a configuration 720, the DMTC period 702 is about 20 ms long, and thus twelve CAT2 LBT 730 attempts are allowed in the DMTC window 202. While the FIG. 7 illustrates the CAT2 LBTs 730 evenly spaced across the DMTC window 202, the CAT2 LBTs 730 may be located any suitable locations within a DMTC window 202.

In an embodiment, when a BS (e.g., BS 105 or BS 400) fails a CAT2 LBT 730 (e.g., at time T0), the BS may perform a CAT4 LBT before a next CAT2 LBT 730. If the CAT4 LBT results in a pass, the BS may transmit a DRS (e.g., the DRS 520). If the BS transmitted a DRS in a current DMTC window 202 based on a CAT4 LBT pass, the BS may be allowed to have a greater number CAT2 LBTs in a next DMTC window 202. For example, the BS may be allowed to have about ten CAT2 LBT 730 attempts in a DMTC window 202. However, if the BS transmitted a DRS in a current DMTC window 202 based on a CAT4 LBT pass, the BS may be allowed to have about twenty CAT2 LBT 730 attempts in a next DMTC window 202.

In some embodiments, a BS (e.g., BS 105 or BS 400) may distribute CAT2 LBTs (e.g., CAT2 LBTs 730) across DMTC windows (e.g., the DMTC window 202) in any suitable manner. As an example, 100 CAT2 LBT attempts are allowed over a period of 100 ms and the DMTC window repeats at intervals of about 20 ms. In other words, there may be five DMTC windows in the 100 ms period. In an example, the BS may include about 20 CAT2 LBT attempts in each of the five DMTC windows. In another example, the BS may include about 50 CAT2 LBT attempts for the first two DMTC windows and may include CAT4 LBT attempts in the next three DMTC windows.

The scheme 700 may use similar mechanisms as the scheme 500 for selecting DRS transmission starting locations and/or CAT2 LBT starting locations. For example, N number of CAT2 LBT starting locations may be selected from a set of allowable CAT2 LBT starting locations within a DMTC window, a subset of the N CAT2 LBT starting locations may be used for actual DRS transmissions, and remaining CAT2 LBT starting location in the N CAT2 LBT starting locations may be used for filler signal and/or reference signal transmissions. The selections of the N CAT2 LBT starting locations and/or subsets may be performed by a BS (e.g., BS 105 or BS 400) or specified by a wireless communication standard or protocol.

Figure 8:
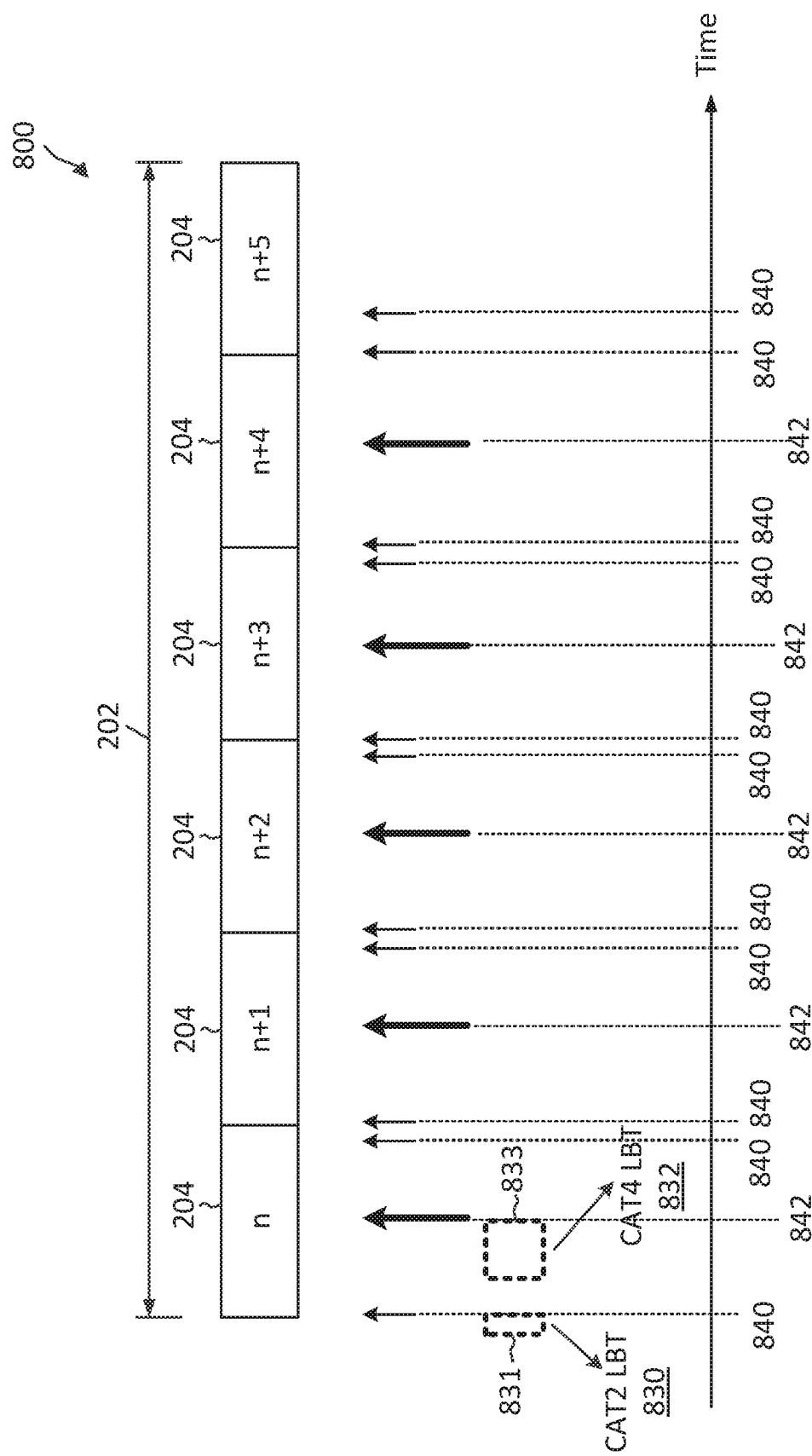
FIG. 8 is a timing diagram illustrating a DRS transmission scheme providing transmission starting locations for CAT2 LBTs and category 4 (CAT4) LBTs according to some embodiments of the present disclosure.

FIG. 8 is a timing diagram illustrating a DRS transmission scheme 800 providing transmission starting locations for CAT2 LBTs and CAT4 LBTs according to some embodiments of the present disclosure. The scheme 800 may be employed by BSs such as the BSs 105 and UEs such as the UEs 115 in a network such as the network 100 for communications. In particular, the BS may perform LBTs and transmit DRSs in a shared channel (e.g., a shared frequency band or an unlicensed frequency band) using the scheme 800. In FIG. 8, the x-axis represents time in some arbitrary units. The scheme 800 is illustrated using the same DMTC window structure as in the schemes 200 and 500 and may use the same reference numerals as in FIGS. 2 and 5 for simplicity's sake.

The scheme 800 may increase the number of DRS transmission starting locations by including CAT4 LBTs in addition to CAT2 LBTs within a DMTC window. For example, a DMTC window 202 may include a plurality of DRS transmission starting locations 840 where a DRS may be transmitted based on a successful CAT2 LBT 830. The CAT2 LBT 830 are shown as short arrows and may be substantially similar to the CAT2 LBTs 230, 530, and 532, where each CAT2 LBT 830 may include a CCA period 831 (e.g., of about 25 μs). When a BS (e.g., BS 105 or BS 400) fails a CAT2 LBT 830, the BS may perform a CAT4 LBT 832 instead of waiting till the next DRS transmission starting location 840 to reattempt another CAT2 LBT 830. A CAT4 LBT 832 may include backoff and a variable contention window and thus may include a longer CCA period 833 than the CAT2 LBT CCA period 831. Depending on the location of the next DRS transmission starting location 840, the BS may have to wait for a substantial duration (e.g., about 500 μs or about 1 ms) before reattempting another CAT2 LBT 830. During the waiting period, another node may grab the channel and start a transmission, and thus reducing the probability for the BS to pass a next CAT2 LBT 830. Thus, performing a CAT4 LBT 832 before a next CAT2 LBT 830 can potentially improve the probability of the BS winning the channel contention.

The BS may start a CAT4 LBT 832 any time within the DMTC window 202. However, this may require the UE to continuously monitor and detect for a DRS within the DMTC window 202, which may be computationally intensive and not practical. To reduce DRS detection and/or decoding complexity at a UE (e.g., UE 115 or 300), the BS may also preconfigure a set of DRS transmission starting locations 842 where a DRS may be transmitted based on a successful CAT4 LBT 832. The BS may communication the DRS transmission starting locations 840 and 842 to a UE to facilitate DRS detection and/or decoding.

In general, a BS may configure a set of DRS transmission locations for a DRS transmission based on a successful CAT2 LBT 830 and a set of DRS transmission locations for a DRS transmissions based on a successful CAT4 LBT 832 within a DMTC window 202. In addition, while not shown, the scheme 800 may allow multiple CAT2 LBT 830 attempts for each DRS transmission starting locations 840 similar to the scheme 500.

Figure 9:
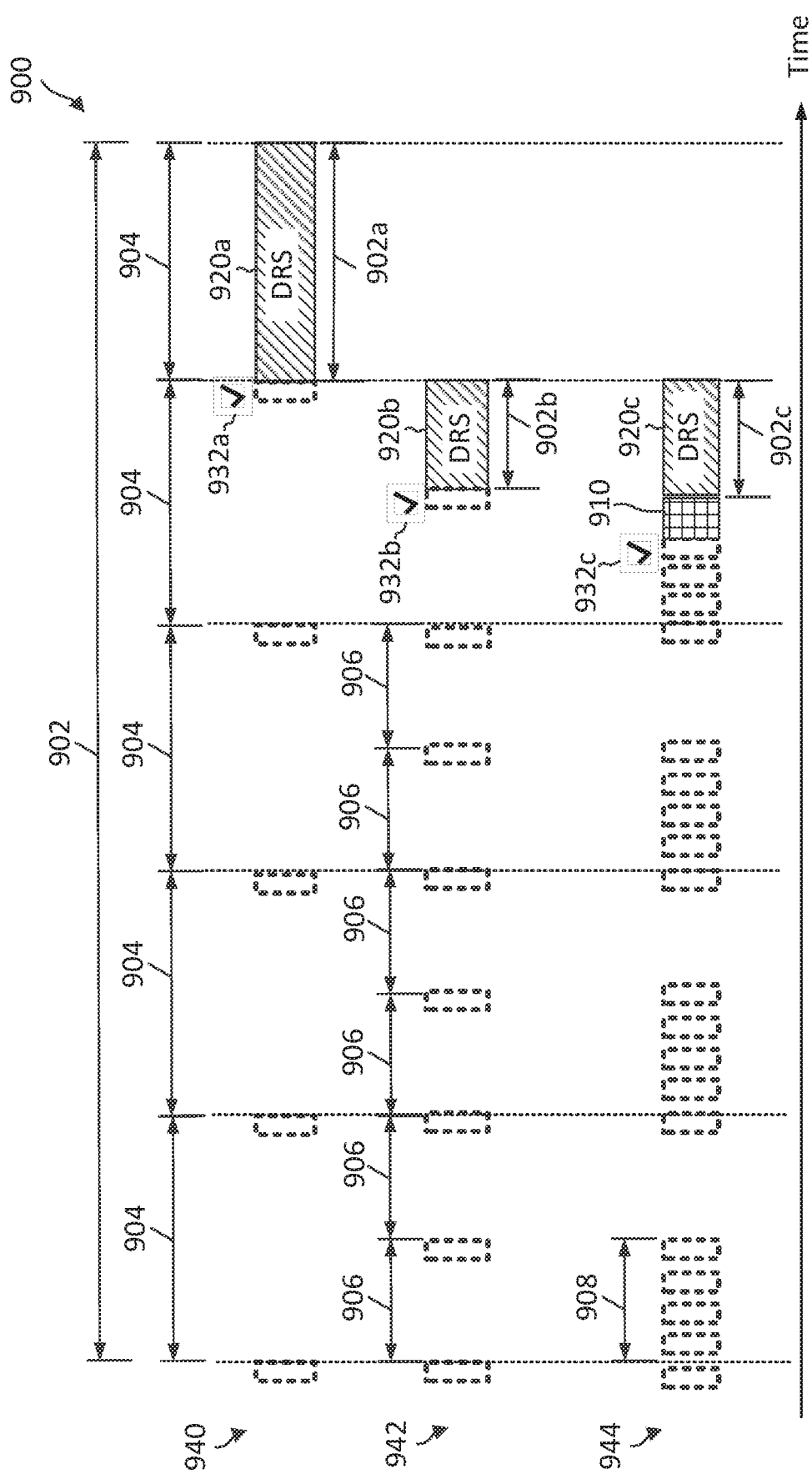
FIG. 9 is a timing diagram illustrating a DRS transmission scheme dependent on a DRS transmission duration according to some embodiments of the present disclosure.

FIG. 9 is a timing diagram illustrating a DRS transmission scheme 900 dependent on a DRS transmission duration according to some embodiments of the present disclosure. The scheme 900 may be employed by BSs such as the BSs 105 and UEs such as the UEs 115 in a network such as the network 100 for communications. In particular, the BS may perform LBTs and transmit DRSs in a shared channel (e.g., a shared frequency band or an unlicensed frequency band) using the scheme 900. In FIG. 9, the x-axis represents time in some arbitrary units. The scheme 900 determines the number of CAT2 LBT 930 attempts in a DMTC window 902 based on the duration of a DRS 920 (shown as 920*a*, 920*b*, and 920*c*). The DRS 920 may be similar to the DRS 220, 520, and 608. The duration of a DRS 920 may vary due to various factors, for example, based on the SCS used for the transmission of the DRS 920, the number of SSBs (e.g., the SSBs 620) included in the DRS 920, the number of beams swept by the DRS 920. The CAT2 LBTs 930 may be similar to the CAT2 LBTs 230, 530, 532, 730, and 830. The DMTC window 902 may be substantially similar to the DMTC window 202. The DMTC window 902 may be repeated at a certain periodicity (e.g., about 10 ms, about 20 ms, about 40 ms, about 80 ms, or about 100 ms). The scheme 900 may allow for a greater number of CAT2 LBT 930 attempts when the DRS duration is shorter. As an example, a transmission with a CAT2 LBT 930 is allowed to have a duration up to about 1 ms within the DMTC window 902 (e.g., with a duration of about 5 ms).

In a configuration 940, a DRS 920*a* may have a duration 902*a* of about 1 ms. When the transmission duration 902*a* is about 1 ms, the scheme 900 may allow about five CAT2 LBT 930 attempts. The CAT2 LBTs 930 may be spaced apart from each other by a duration 904 of about 1 ms. A BS (e.g., BS 105 or BS 400) may perform a CAT2 LBT 930 at each of the CAT2 LBT 930 location. When the BS passes a CAT2 LBT 930 as shown by the checkmark 932*a*, the BS may transmit a DRS 920*a*.

In a configuration 942, the DRS 920*b* may have a duration 902*b* of about 500 μs. When the transmission duration 902*a* is about 500 μs, the scheme 900 may allow about ten CAT2 LBT 930 attempts. The CAT2 LBTs 930 may be spaced apart from each other by a duration 906 of about 500 μs. When the BS passes a CAT2 LBT 930 as shown by the checkmark 932*b*, the BS may transmit a DRS 920*b*.

In a configuration 944, the DRS 920*c* may have a duration 902*c* of about 500 μs similar to the configuration 942. However, in the configuration 944, when the transmission duration 902*c* is about 500 μs, the scheme 900 allows additional CAT2 LBTs 930 attempts in the remaining duration 908. When the BS passes a CAT2 LBT 930 as shown by the checkmark 932*c*, the BS may transmit a DRS 920*c*. Similar to the schemes 200, 500, and 600 described above in FIGS. 2, 5, and, respectively, the BS may transmit in the channel as soon as a CAT2 LBT 930 passes. Thus, when the BS passes a CAT2 LBT 930 at a time earlier than a DRS transmission location, the BS may transmit a reference signal 910 (e.g., a CSI-RS or a TRS) or a filler signal before the DRS 920*c*.

Figure 10:
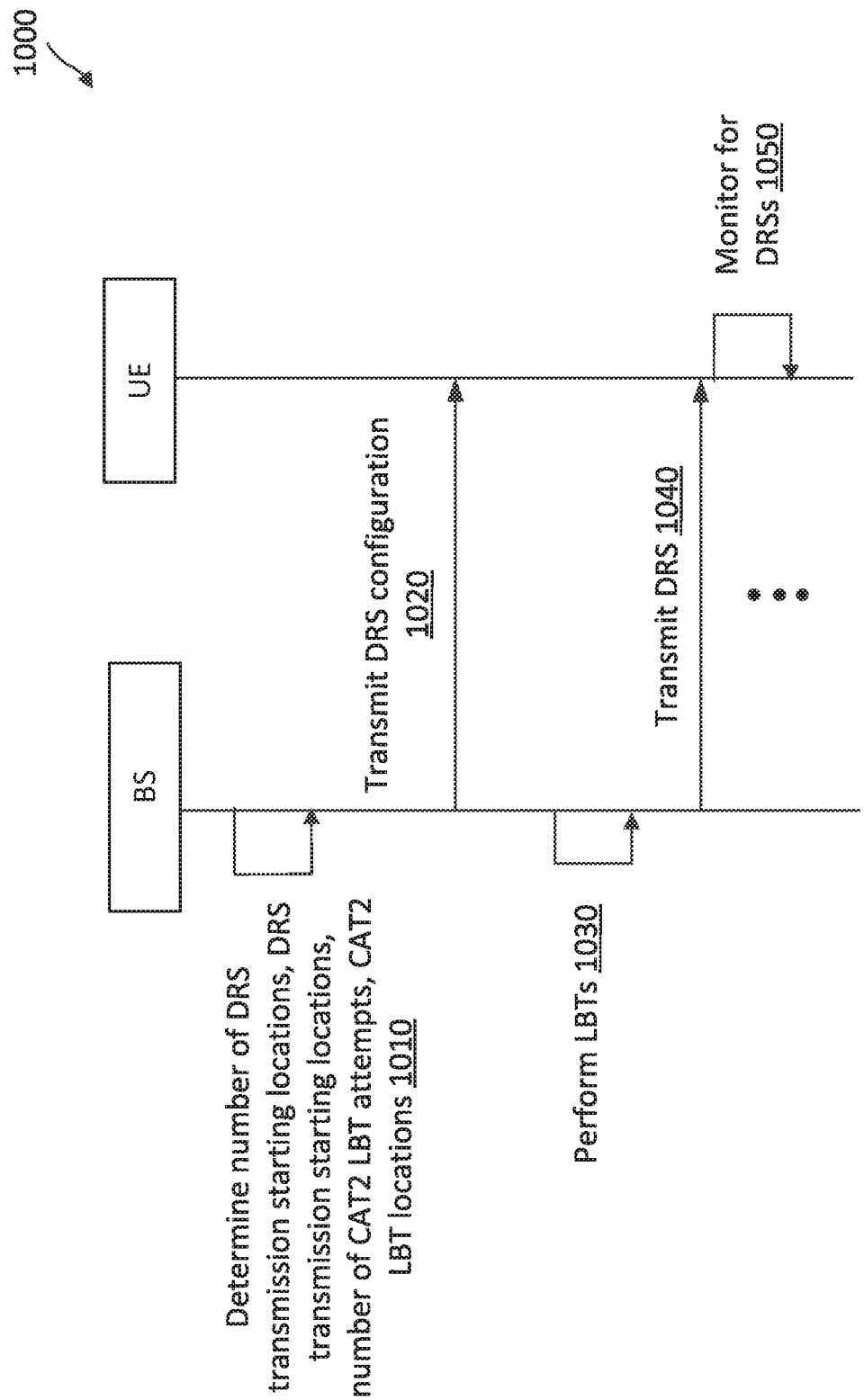
FIG. 10 is signaling diagram illustrating a DRS communication method according to some embodiments of the present disclosure.

FIG. 10 is a signaling diagram illustrating a DRS communication method 1000 according to some embodiments of the present disclosure. The method 1000 may be implemented between a BS (e.g., BS 105 or BS 400) and a UE (e.g., the UE 115 or UE 300). The method 1000 may employ similar mechanisms as in the schemes 200, 500, 600, 700, 800, 900, and 1000 described above with respect to FIGS. 2, 5, 6, 7, 8, 9, and 10. Steps of the method 1000 can be executed by computing devices (e.g., a processor, processing circuit, and/or other suitable component) of the BS and the UE. In an example, the BS may utilize one or more components, such as the processor 402, the memory 404, the DRS communication module 408, the transceiver 410, the modem 412, and the one or more antennas 416, to execute the steps of method 1000. The UE may utilize one or more components, such as the processor 302, the memory 304, the DRS communication module 308, the transceiver 310, the modem 312, and the one or more antennas 316, to execute the steps of method 1000. As illustrated, the method 1000 includes a number of enumerated steps, but embodiments of the method 1000 may include additional steps before, after, and in between the enumerated steps. In some embodiments, one or more of the enumerated steps may be omitted or performed in a different order.

At step 1010, the BS determines a number of DRS transmission starting locations (e.g., the DRS transmission starting locations 540, 640, 840, and/or 842), the DRS transmission starting locations, a number of allowable CAT2 LBT attempts (e.g., the CAT2 LBTs 230, 530, 532, 730, 830, and/or 930), and/or the CAT2 LBT starting locations (e.g., the CAT2 LBT starting locations 542) for a DMTC window (e.g., the DMTC windows 202 and/or 902). In an example, the BS may determine the DRS transmission starting locations based on transmission boundaries of SSB (e.g., the SSBs 620) and/or RMSI PDCCH signals (e.g., the RMSI PDCCH signal 610) in a DRS (e.g., the DRSs 220, 520, 608, and 920), where the transmission boundaries may be specified by a standard (e.g., the 3GPP standard). In an example, the BS may determine the DRS transmission starting locations based on the SCS of the DRS, the SCS of the SSBs in the DRS, the number of SSBs in the DRS, and/or a transmission duration of the DRS. In an example, the BS may determine a number of DRS transmission starting locations in the DMTC window based on a duration of the DMTC window.

At step 1020, the BS transmits a DRS configuration. The DRS configuration may indicate the DRS transmissions starting locations.

At step 1030, the BS performs one or more LBTs. The BS may perform one or more CAT2 LBTs based on the determined CAT2 LBT starting locations. In some embodiments, upon a CAT2 LBT failure, the BS may additionally perform a CAT4 LBT (e.g., the CAT4 LBTs 832). In some embodiments, the BS may limit when a CAT4 LBT may be performed within a DMTC window to reduce complexity at the UE. Thus, the BS may include, in the DRS configuration, indications potential CAT4 LBT locations within in the in DMTC window.

At step 1040, upon passing a CAT2 LBT, the BS transmits a DRS. Depending when the BS passes the CAT2 LBT, the BS may transmit a filler signal (e.g., the filler signal 210 or 510) and/or a reference signal (e.g., the reference signal 910) before the DRS as shown in the scheme 500 and 900 described above with respect to FIGS. 5 and 9, respectively.

At step 1050, the UE monitors for DRS based on the DRS configuration. For example, the UE may perform hypothesis based on the DRS transmission starting locations indicated by a standard specification or the DRS configuration. The UE may attempt to detect for a DRS and/or perform decoding on signals received from the channel according to the DRS transmissions starting location.

Figure 11:
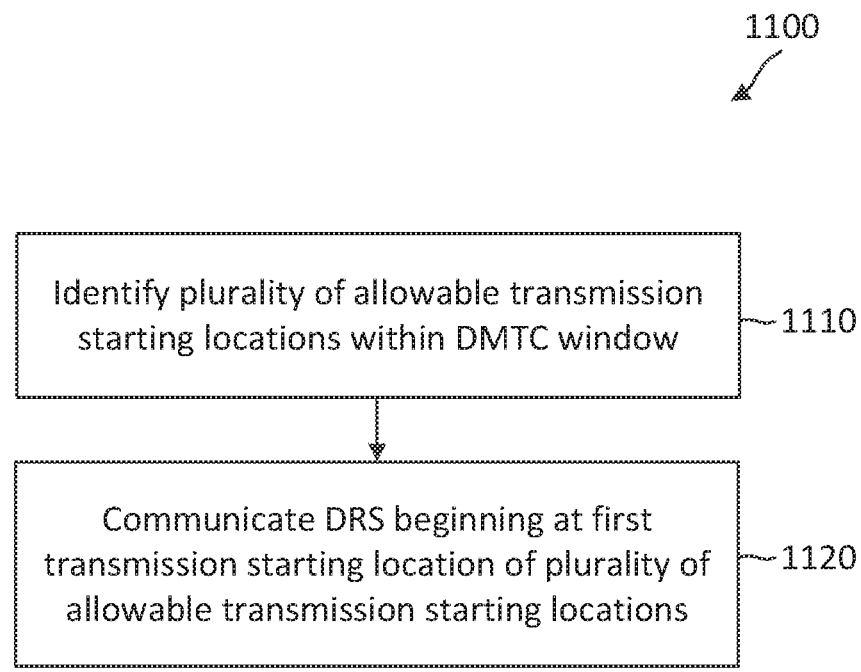
FIG. 11 is a flow diagram of a DRS communication method according to some embodiments of the present disclosure.

FIG. 11 is a flow diagram of a DRS communication method 1100 according to some embodiments of the present disclosure. Steps of the method 1100 can be executed by a computing device (e.g., a processor, processing circuit, and/or other suitable component) of a wireless communication device or other suitable means for performing the steps. For example, a wireless communication device, such as the UE 115 or UE 300, may utilize one or more components, such as the processor 302, the memory 304, the DRS communication module 308, the transceiver 410, the modem 312, and the one or more antennas 316, to execute the steps of method 1100. In another example, a wireless communication device, such as the BS 105 or BS 400, may utilize one or more components, such as the processor 402, the memory 404, the DRS communication module 408, the transceiver 410, the modem 412, and the one or more antennas 416, to execute the steps of method 1100. The method 1100 may employ similar mechanisms as in the schemes 200, 500, 600, 700, 800, 900, and 1000 described with respect to FIGS. 2, 5, 6, 7, 8, 9, and 10, respectively, and/or the method 1000 described with respect to FIG. 10. As illustrated, the method 1100 includes a number of enumerated steps, but embodiments of the method 1100 may include additional steps before, after, and in between the enumerated steps. In some embodiments, one or more of the enumerated steps may be omitted or performed in a different order.

At step 1110, the method 1100 includes identifying, by a first wireless communication device, a plurality of allowable transmission starting locations (e.g., the DRS transmission starting locations 540 and 840) within a DMTC window (e.g., the DMTC windows 202 and/or 902), where at least one of the plurality of allowable transmission starting locations is offset from boundaries of a plurality of transmission slots (e.g., the transmission slots 204) of the DMTC window. The plurality of allowable transmission starting locations is associated with an allowable number of CAT2 LBTs (e.g., the CAT2 LBTs 530, 532, 730, 830, and/or 930) within the DMTC window.

At step 1120, the method 1100 includes communicating, by the first wireless communication device with a second wireless communication device, a DRS (e.g., the DRSs 520 and 920) beginning at a first transmission starting location of the plurality of allowable transmission starting locations.

In an embodiment, first wireless communication device corresponds to a BS (e.g., BS 105 or BS 400) and the second wireless communication device corresponds to a UE (e.g., UE 115 or UE 300). In such an embodiment, the communicating includes transmitting, by the first wireless communication device to the second wireless communication device, the DRS.

In an embodiment, first wireless communication device corresponds to a UE (e.g., UE 115 or UE 300) and the second wireless communication device corresponds to a BS (e.g., BS 105 or BS 400). In such an embodiment, the communicating includes receiving, by the first wireless communication device from the second wireless communication device, the DRS.

In an embodiment, the plurality of allowable transmission starting locations is based on at least one of a SSB (e.g., the SSBs 620) transmission boundary or a RMSI control information (e.g., the RMSI PDCCH signal 610) transmission boundary.

In an embodiment, the plurality of allowable transmission starting locations is based on at least one of an SCS associated with the DRS, a number of SSBs associated with the DRS, or a transmission duration (e.g., the duration 602, 902a, 902b, and/or 902c) of the DRS.

In an embodiment, a number of the plurality of allowable transmission starting locations is based on a duration of the DMTC window.

In an embodiment, the first wireless communication device further communicates, with the second wireless communication device, a configuration indicating the plurality of allowable transmission starting locations.

In an embodiment, the first wireless communication device further determines the plurality of allowable transmission starting locations based on the allowable number of CAT2 LBTs within the DMTC window.

In an embodiment, the communicating includes transmitting, by the first wireless communication device, the DRS beginning at the first transmission starting location based on a CAT2 LBT. In an embodiment, the first wireless communication device further performs the CAT2 LBT based on one or more LBT starting locations (e.g., the LBT starting locations 542) determined based on the allowable number of CAT2 LBTs in the DMTC window. In an embodiment, the performing the CAT2 LBT is further based on a first LBT starting location of the one or more LBT starting locations associated with the first transmission starting location. In an embodiment, the first wireless communication device further transmits, to the second wireless communication device, at least one of a filler signal (e.g., the filler signal 510) or a reference signal (e.g., the reference signal 910) before the DRS in response to the CAT2 LBT. In an embodiment, the first wireless communication device further determines the one or more LBT starting locations based on the allowable number of CAT2 LBTs within the DMTC window.

In an embodiment, the first wireless communication device further determines the allowable number of CAT2 LBTs within the DMTC window based on at least one of an SCS associated with the DRS, a number of SSBs associated with the DRS, or a duration of the DRS.

In an embodiment, the first wireless communication device further determines the allowable number of CAT2

LBTs within the DMTC window based on a periodicity (e.g., the DMTC period 702) of the DMTC window.

In an embodiment, the first wireless communication device further determines the allowable number of CAT2 LBTs within the DMTC window based on whether a CAT2 LBT or a CAT4 LBT (e.g., the CAT4 LBT 832) is performed for a DRS transmission in a previous DMTC window. For example, when a DRS transmission in a previous DMTC window is based on a CAT4 LBT, the number of CAT2 LBTs may in the DMTC window may be increased.

In an embodiment, the first wireless communication device further performs a CAT2 LBT based on a plurality of allowable transmission starting locations in another DMTC window. The first wireless communication device further performs a CAT4 LBT within the another DMTC window in response to a failure of the CAT2 LBT. The first wireless communication device further transmits another DRS during the another DMTC window based on the CAT4 LBT. In an embodiment, the CAT2 LBT is performed based on a first subset of the plurality of allowable transmission starting locations in the another DMTC window associated with a CAT2 LBT and the CAT4 LBT is performed based on a second subset of the plurality of allowable transmission starting locations in the another DMTC window associated with a CAT4 LBT.

In an embodiment, the first wireless communication device further monitors for the DRS based on the plurality of allowable transmission starting locations.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

Further embodiments of the present disclosure include a method of wireless communication. The method includes identifying, by a first wireless communication device, a plurality of allowable transmission starting locations within a discovery reference signal measurement time configuration (DMTC) window, where at least one of the plurality of allowable transmission starting locations is offset from boundaries of a plurality of transmission slots of the DMTC window, and where the plurality of allowable transmission starting locations is associated with an allowable number of category 2 (CAT2) listen-before-talks (LBTs) within the DMTC window. The method also includes communicating, by the first wireless communication device with a second wireless communication device, a discovery reference signal (DRS) beginning at a first transmission starting location of the plurality of allowable transmission starting locations.

In some aspects, the method may include where the plurality of allowable transmission starting locations is based on at least one of a synchronization signal block (SSB) transmission boundary or a remaining system information (RMSI) control information transmission boundary. The plurality of allowable transmission starting locations is based on at least one of a subcarrier spacing associated with the DRS, a number of SSBs associated with the DRS, or a transmission duration of the DRS. A number of the plurality of allowable transmission starting locations is based on a duration of the DMTC window. The method may include communicating, by the first wireless communication device with the second wireless communication device, a configuration indicating the plurality of allowable transmission starting locations. The method may include determining, by the first wireless communication device, the plurality of allowable transmission starting locations based on the allowable number of CAT2 LBTs within the DMTC window. The communicating includes transmitting, by the first wireless communication device, the DRS beginning at the first transmission starting location based on a CAT2 LBT. The method may include performing, by the first wireless communication device, the CAT2 LBT based on one or more LBT starting locations determined based on the allowable number of CAT2 LBTs in the DMTC window. The performing the CAT2 LBT is further based on a first LBT starting location of the one or more LBT starting locations associated with the first transmission starting location. The method may include transmitting, by the first wireless communication device to the second wireless communication device, at least one of a filler signal or a reference signal before the DRS in response to the CAT2 LBT. The method may include determining, by the first wireless communication device, the one or more LBT starting locations based on the allowable number of CAT2 LBTs within the DMTC window. The method may include determining, by the first wireless communication device, the allowable number of CAT2 LBTs within the DMTC window based on at least one of a subcarrier spacing associated with the DRS, a number of SSBs associated with the DRS, or a duration of the DRS. The method may include determining, by the first wireless communication device, the allowable number of CAT2 LBTs within the DMTC window based on a periodicity of the DMTC window. The method may include determining, by the first wireless communication device, the allowable number of CAT2 LBTs within the DMTC window based on whether a CAT2 LBT or a category 4 (CAT4) LBT is performed for a DRS transmission in a previous DMTC window. The method may include performing, by the first wireless communication device, a CAT2 LBT based on a plurality of allowable transmission starting locations in another DMTC window; performing, by the first wireless communication device, a category 4 (CAT4) LBT within the another DMTC window in response to a failure of the CAT2 LBT; and transmitting, by the first wireless communication device, another DRS during the another DMTC window based on the CAT4 LBT. The performing the CAT2 LBT is based on a first subset of the plurality of allowable transmission starting locations in the another DMTC window associated with a CAT2 LBT, and where the performing the CAT4 LBT is further based on a second subset of the plurality of allowable transmission starting locations in the another DMTC window associated with a CAT4 LBT. The method may include monitoring, by the first wireless communication device, for the DRS based on the plurality of allowable transmission starting locations.

Further embodiments of the present disclosure include an apparatus including a processor configured to identify a plurality of allowable transmission starting locations within a discovery reference signal measurement time configuration (DMTC) window, where at least one of the plurality of allowable transmission starting locations is offset from boundaries of a plurality of transmission slots of the DMTC window, and where the plurality of allowable transmission starting locations is associated with an allowable number of category 2 (CAT2) listen-before-talks (LBTs) within the DMTC window. The apparatus also includes a transceiver configured to communicate, with a wireless communication device, a discovery reference signal (DRS) beginning at a first transmission starting location of the plurality of allowable transmission starting locations.

In some aspects, the apparatus may also include where the plurality of allowable transmission starting locations is based on at least one of a synchronization signal block (SSB) transmission boundary or a remaining system information (RMSI) control information transmission boundary. The plurality of allowable transmission starting locations is based on at least one of a subcarrier spacing associated with the DRS, a number of SSBs associated with the DRS, or a transmission duration of the DRS. A number of the plurality of allowable transmission starting locations is based on a duration of the DMTC window. The transceiver is further configured to communicate, with the wireless communication device, a configuration indicating the plurality of allowable transmission starting locations. The processor is further configured to determine the plurality of allowable transmission starting locations based on the allowable number of CAT2 LBTs within the DMTC window. The transceiver configured to communicate the DRS is further configured to transmit the DRS beginning at the first transmission starting location based on a CAT2 LBT. The processor is further configured to perform the CAT2 LBT based on one or more LBT starting locations determined based on the allowable number of CAT2 LBTs in the DMTC window. The processor configured to perform the CAT2 LBT is further configured to perform the CAT2 LBT based on a first LBT starting location of the one or more LBT starting locations associated with the first transmission starting location. The transceiver is further configured to transmit, to the wireless communication device, at least one of a filler signal or a reference signal before the DRS in response to the CAT2 LBT. The processor is further configured to determine the one or more LBT starting locations based on the allowable number of CAT2 LBTs within the DMTC window. The processor is further configured to determine the allowable number of CAT2 LBTs within the DMTC window based on at least one of a subcarrier spacing associated with the DRS, a number of SSBs associated with the DRS, or a duration of the DRS. The processor is further configured to determine the allowable number of CAT2 LBTs within the DMTC window based on a periodicity of the DMTC window. The processor is further configured to determine the allowable number of CAT2 LBTs within the DMTC window based on whether a CAT2 LBT or a category 4 (CAT4) LBT is performed for a DRS transmission in a previous DMTC window. The processor is further configured to perform a CAT2 LBT based on a plurality of allowable transmission starting locations in another DMTC window; and perform a category 4 (CAT4) LBT within the another DMTC window in response to a failure of the CAT2 LBT, and the transceiver is further configured to transmit another DRS during the another DMTC window based on the CAT4 LBT. Colon> the transceiver configured to perform the CAT2 LBT is further configured to perform the CAT2 LBT based on a first subset of the plurality of allowable transmission starting locations in the another DMTC window associated with a CAT2 LBT, and the transceiver configured to perform the CAT4 LBT is further configured to perform the CAT4 LBT based on a second subset of the plurality of allowable transmission starting locations in the another DMTC window associated with a CAT4 LBT. The processor is further configured to monitor for the DRS based on the plurality of allowable transmission starting locations.

Further embodiments of the present disclosure include a non-transitory computer-readable medium having program code recorded thereon. The non-transitory computer-readable medium also includes code for causing a first wireless communication device to identify a plurality of allowable transmission starting locations within a discovery reference signal measurement time configuration (DMTC) window, where at least one of the plurality of allowable transmission starting locations is offset from boundaries of a plurality of transmission slots of the DMTC window, and where the plurality of allowable transmission starting locations is associated with an allowable number of category 2 (CAT2) listen-before-talks (LBTs) within the DMTC window. The non-transitory computer-readable medium also includes code for causing the first wireless communication device to communicate, with a second wireless communication device, a discovery reference signal (DRS) beginning at a first transmission starting location of the plurality of allowable transmission starting locations.

In some aspects, the non-transitory computer-readable medium may also where the plurality of allowable transmission starting locations is based on at least one of a synchronization signal block (SSB) transmission boundary or a remaining system information (RMSI) control information transmission boundary. The plurality of allowable transmission starting locations is based on at least one of a subcarrier spacing associated with the DRS, a number of SSBs associated with the DRS, or a transmission duration of the DRS. A number of the plurality of allowable transmission starting locations is based on a duration of the DMTC window. The non-transitory computer-readable medium may include code for causing the first wireless communication device to communicate, with the second wireless communication device, a configuration indicating the plurality of allowable transmission starting locations. The non-transitory computer-readable medium may include code for causing the first wireless communication device to determine the plurality of allowable transmission starting locations based on the allowable number of CAT2 LBTs within the DMTC window. The code for causing the first wireless communication device to communicate the DRS is further configured to transmit the DRS beginning at the first transmission starting location based on a CAT2 LBT. The non-transitory computer-readable medium may include code for causing the first wireless communication device to perform the CAT2 LBT based on one or more LBT starting locations determined based on the allowable number of CAT2 LBTs in the DMTC window. The code for causing the first wireless communication device to perform the CAT2 LBT is further configured to perform the CAT2 LBT based on a first LBT starting location of the one or more LBT starting locations associated with the first transmission starting location. The non-transitory computer-readable medium may include code for causing the first wireless communication device to transmit, to the second wireless communication device, at least one of a filler signal or a reference signal before the DRS in response to the CAT2 LBT. The non-transitory computer-readable medium may include code for causing the first wireless communication device to determine the one or more LBT starting locations based on the allowable number of CAT2 LBTs within the DMTC window. The non-transitory computer-readable medium may include code for causing the first wireless communication device to determine the allowable number of CAT2 LBTs within the DMTC window based on at least one of a subcarrier spacing associated with the DRS, a number of SSBs associated with the DRS, or a duration of the DRS. The non-transitory computer-readable medium may include code for causing the first wireless communication device to determine the allowable number of CAT2 LBTs within the DMTC window based on a periodicity of the DMTC window. The non-transitory computer-readable medium may include code for causing the first wireless communication device to determine the allowable number of CAT2 LBTs within the DMTC window based on whether a CAT2 LBT or a category 4 (CAT4) LBT is performed for a DRS transmission in a previous DMTC window. The non-transitory computer-readable medium may include code for causing the first wireless communication device to perform a CAT2 LBT based on a plurality of allowable transmission starting locations in another DMTC window; code for causing the first wireless communication device to perform a category 4 (CAT4) LBT within the another DMTC window in response to a failure of the CAT2 LBT; and code for causing the first wireless communication device to transmit another DRS during the another DMTC window based on the CAT4 LBT. The code for causing the first wireless communication device to perform the CAT2 LBT is further configured to perform the CAT2 LBT based on a first subset of the plurality of allowable transmission starting locations in the another DMTC window associated with a CAT2 LBT, and the code for causing the first wireless communication device to perform the CAT4 LBT is further configured to perform the CAT4 LBT based on a second subset of the plurality of allowable transmission starting locations in the another DMTC window associated with a CAT4 LBT. The non-transitory computer-readable medium may include code for causing the first wireless communication device to monitor for the DRS based on the plurality of allowable transmission starting locations.

Further embodiments of the present disclosure include an apparatus including means for identifying a plurality of allowable transmission starting locations within a discovery reference signal measurement time configuration (DMTC) window, where at least one of the plurality of allowable transmission starting locations is offset from boundaries of a plurality of transmission slots of the DMTC window, and where the plurality of allowable transmission starting locations is associated with an allowable number of category 2 (CAT2) listen-before-talks (LBTs) within the DMTC window. The apparatus also includes means for communicating, with a wireless communication device, a discovery reference signal (DRS) beginning at a first transmission starting location of the plurality of allowable transmission starting locations.

In some aspects, the apparatus may also include where the plurality of allowable transmission starting locations is based on at least one of a synchronization signal block (SSB) transmission boundary or a remaining system information (RMSI) control information transmission boundary. The plurality of allowable transmission starting locations is based on at least one of a subcarrier spacing associated with the DRS, a number of SSBs associated with the DRS, or a transmission duration of the DRS. A number of the plurality of allowable transmission starting locations is based on a duration of the DMTC window. The apparatus may include means for communicating, with the wireless communication device, a configuration indicating the plurality of allowable transmission starting locations. The apparatus may include means for determining the plurality of allowable transmission starting locations based on the allowable number of CAT2 LBTs within the DMTC window. The means for communicating the DRS is further configured to transmit the DRS beginning at the first transmission starting location based on a CAT2 LBT. The apparatus may include means for performing the CAT2 LBT based on one or more LBT starting locations determined based on the allowable number of CAT2 LBTs in the DMTC window. The means for performing the CAT2 LBT is further configured to perform the CAT2 LBT based on a first LBT starting location of the one or more LBT starting locations associated with the first transmission starting location. The apparatus may include means for transmitting, to the wireless communication device, at least one of a filler signal or a reference signal before the DRS in response to the CAT2 LBT. The apparatus may include means for determining the one or more LBT starting locations based on the allowable number of CAT2 LBTs within the DMTC window. The apparatus may include means for determining the allowable number of CAT2 LBTs within the DMTC window based on at least one of a subcarrier spacing associated with the DRS, a number of SSBs associated with the DRS, or a duration of the DRS. The apparatus may include means for determining the allowable number of CAT2 LBTs within the DMTC window based on a periodicity of the DMTC window. The apparatus may include means for determining the allowable number of CAT2 LBTs within the DMTC window based on whether a CAT2 LBT or a category 4 (CAT4) LBT is performed for a DRS transmission in a previous DMTC window. The apparatus may include means for performing a CAT2 LBT based on a plurality of allowable transmission starting locations in another DMTC window; means for performing a category 4 (CAT4) LBT within the another DMTC window in response to a failure of the CAT2 LBT; and means for transmitting another DRS during the another DMTC window based on the CAT4 LBT. The means for performing the CAT2 LBT is further configured to perform the CAT2 LBT based on a first subset of the plurality of allowable transmission starting locations in the another DMTC window associated with a CAT2 LBT, and the means for performing the CAT4 LBT is further configured to perform the CAT4 LBT based on a second subset of the plurality of allowable transmission starting locations in the another DMTC window associated with a CAT4 LBT. The apparatus may include means for monitoring for the DRS based on the plurality of allowable transmission starting locations.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication, comprising:
identifying, by a first wireless communication device, a plurality of allowable transmission starting locations within a discovery reference signal measurement time configuration (DMTC) window, wherein at least one of the plurality of allowable transmission starting locations is offset from boundaries of a plurality of transmission slots of the DMTC window, and wherein the plurality of allowable transmission starting locations is associated with a maximum allowable number of listen-before-talks (LBTs) within the DMTC window;
communicating at least one of a filler signal or a reference signal based on a successful LBT; and
communicating, by the first wireless communication device with a second wireless communication device based on the successful LBT, a discovery reference signal (DRS) beginning at a first transmission starting location of the plurality of allowable transmission starting locations.

2. The method of claim 1, wherein the plurality of allowable transmission starting locations is based on at least one of a synchronization signal block (SSB) transmission boundary or a remaining system information (RMSI) control information transmission boundary.

3. The method of claim 1, wherein the plurality of allowable transmission starting locations is based on at least one of a subcarrier spacing associated with the DRS, a number of SSBs associated with the DRS, or a transmission duration of the DRS.

4. The method of claim 1, wherein a number of the plurality of allowable transmission starting locations is based on a duration of the DMTC window.

5. The method of claim 1, further comprising:
communicating, by the first wireless communication device with the second wireless communication device, a configuration indicating the plurality of allowable transmission starting locations.

6. The method of claim 1, further comprising:
determining, by the first wireless communication device, the plurality of allowable transmission starting locations based on the maximum allowable number of LBTs within the DMTC window.

7. The method of claim 1, wherein the communicating includes:
transmitting, by the first wireless communication device, the DRS beginning at the first transmission starting location based on the successful LBT.

8. The method of claim 7, further comprising:
performing, by the first wireless communication device, the LBT based on one or more LBT starting locations determined based on the maximum allowable number of LBTs in the DMTC window.

9. The method of claim 8, wherein the performing the LBT is further based on a first LBT starting location of the one or more LBT starting locations associated with the first transmission starting location.

10. The method of claim 9, further comprising:
transmitting, by the first wireless communication device to the second wireless communication device, at least one of the filler signal or the reference signal before the DRS in response to the LBT.

11. The method of claim 8, further comprising:
determining, by the first wireless communication device, the one or more LBT starting locations based on the maximum allowable number of LBTs within the DMTC window.

12. The method of claim 1, further comprising:
determining, by the first wireless communication device, the maximum allowable number of LBTs within the DMTC window based on at least one of a subcarrier spacing associated with the DRS, a number of SSBs associated with the DRS, or a duration of the DRS.

13. The method of claim 1, further comprising:
determining, by the first wireless communication device, the maximum allowable number of LBTs within the DMTC window based on a periodicity of the DMTC window.

14. The method of claim 1, further comprising:
determining, by the first wireless communication device, the maximum allowable number of LBTs within the DMTC window based on whether a CAT2 LBT or a category 4 (CAT4) LBT is performed for a DRS transmission in a previous DMTC window.

15. The method of claim 1, further comprising:
performing, by the first wireless communication device, a CAT2 LBT based on a plurality of allowable transmission starting locations in another DMTC window;
performing, by the first wireless communication device, a category 4 (CAT4) LBT within the another DMTC window in response to a failure of the CAT2 LBT; and
transmitting, by the first wireless communication device, another DRS during the another DMTC window based on the CAT4 LBT.

16. The method of claim 15, wherein the performing the CAT2 LBT is based on a first subset of the plurality of allowable transmission starting locations in the another DMTC window associated with a CAT2 LBT, and wherein the performing the CAT4 LBT is further based on a second subset of the plurality of allowable transmission starting locations in the another DMTC window associated with a CAT4 LBT.

17. The method of claim 1, further comprising:
monitoring, by the first wireless communication device, for the DRS based on the plurality of allowable transmission starting locations.

18. An apparatus comprising:
a processor configured to identify a plurality of allowable transmission starting locations within a discovery reference signal measurement time configuration (DMTC) window, wherein at least one of the plurality of allowable transmission starting locations is offset from boundaries of a plurality of transmission slots of the DMTC window, and wherein the plurality of allowable transmission starting locations is associated with a maximum allowable number of listen-before-talks (LBTs) within the DMTC window;
a transceiver configured to communicate at least one of a filler signal or a reference signal based on a successful LBT; and a transceiver configured to communicate, with a wireless communication device based on the successful LBT, a discovery reference signal (DRS) beginning at a first transmission starting location of the plurality of allowable transmission starting locations.

19. The apparatus of claim 18, wherein the plurality of allowable transmission starting locations is based on at least one of a synchronization signal block (SSB) transmission boundary or a remaining system information (RMSI) control information transmission boundary.

20. The apparatus of claim 18, wherein the plurality of allowable transmission starting locations is based on at least one of a subcarrier spacing associated with the DRS, a number of SSBs associated with the DRS, or a transmission duration of the DRS.

21. The apparatus of claim 18, wherein a number of the plurality of allowable transmission starting locations is based on a duration of the DMTC window.

22. The apparatus of claim 18, wherein the transceiver is further configured to:
communicate, with the wireless communication device, a configuration indicating the plurality of allowable transmission starting locations.

23. The apparatus of claim 18, wherein the processor is further configured to:
determine the maximum allowable number of LBTs within the DMTC window based on at least one of:
a subcarrier spacing associated with the DRS;
a number of SSBs associated with the DRS;
a duration of the DRS;
a periodicity of the DMTC window; or
whether a CAT2 LBT or a category 4 (CAT4) LBT is performed for a DRS transmission in a previous DMTC window; and
determine the plurality of allowable transmission starting locations based on the maximum allowable number of LBTs within the DMTC window.

24. The apparatus of claim 18, wherein the transceiver configured to communicate the DRS is further configured to:
transmit the DRS beginning at the first transmission starting location based on the successful LBT.

25. The apparatus of claim 18, wherein:
the processor is further configured to:
perform a CAT2 LBT based on a plurality of allowable transmission starting locations in another DMTC window; and
perform a category 4 (CAT4) LBT within the another DMTC window in response to a failure of the CAT2 LBT, and
the transceiver is further configured to:
transmit another DRS during the another DMTC window based on the CAT4 LBT.

26. The apparatus of claim 18, wherein the processor is further configured to:
monitor for the DRS based on the plurality of allowable transmission starting locations.

27. A non-transitory computer-readable medium having program code recorded thereon, the program code comprising:
code for causing a first wireless communication device to identify a plurality of allowable transmission starting locations within a discovery reference signal measurement time configuration (DMTC) window, wherein at least one of the plurality of allowable transmission starting locations is offset from boundaries of a plurality of transmission slots of the DMTC window, and wherein the plurality of allowable transmission starting locations is associated with a maximum allowable number of listen-before-talks (LBTs) within the DMTC window;
code for causing the first wireless communication device to communicate at least one of a filler signal or a reference signal based on a successful LBT; and
code for causing the first wireless communication device to communicate, with a second wireless communication device based on the successful LBT, a discovery reference signal (DRS) beginning at a first transmission starting location of the plurality of allowable transmission starting locations.

28. The non-transitory computer-readable medium of claim 27, wherein the plurality of allowable transmission starting locations is based on at least one of:
a synchronization signal block (SSB) transmission boundary;
a remaining system information (RMSI) control information transmission boundary;
a subcarrier spacing associated with the DRS;
a number of SSBs associated with the DRS;
a transmission duration of the DRS; or
a duration of the DMTC window.

29. The non-transitory computer-readable medium of claim 27, further comprising:
code for causing the first wireless communication device to communicate, with the second wireless communication device, a configuration indicating the plurality of allowable transmission starting locations.

30. The non-transitory computer-readable medium of claim 27, further comprising:
code for causing the first wireless communication device to determine the plurality of allowable transmission starting locations based on the maximum allowable number of LBTs within the DMTC window.

* * * * *